United States Patent
Chodor et al.

(10) Patent No.: US 12,469,199 B2
(45) Date of Patent: Nov. 11, 2025

(54) PROGRAMMABLE GPU COMMAND BUFFERS USING MUTABLE COMMAND LISTS

(71) Applicant: Intel Corporation, Santa Clara, CA (US)

(72) Inventors: Jaroslaw Chodor, Bydgoszcz (PL); Zbigniew Zdanowicz, Gdansk PM (PL)

(73) Assignee: Intel Corporation, Santa Clara, CA (US)

( * ) Notice: Subject to any disclaimer, the term of this patent is extended or adjusted under 35 U.S.C. 154(b) by 862 days.

(21) Appl. No.: 17/518,229

(22) Filed: Nov. 3, 2021

(65) Prior Publication Data

US 2023/0138635 A1    May 4, 2023

(51) Int. Cl.
G06F 9/455    (2018.01)
G06F 8/41     (2018.01)
(Continued)

(52) U.S. Cl.
CPC .............. *G06T 15/005* (2013.01); *G06F 8/41* (2013.01); *G06F 9/3005* (2013.01); *G06F 9/323* (2023.08); *G06F 9/45516* (2013.01); *G06F 9/4843* (2013.01); *G06F 9/545* (2013.01); *G06T 1/20* (2013.01); *G06T 1/60* (2013.01)

(58) Field of Classification Search
None
See application file for complete search history.

(56) References Cited

U.S. PATENT DOCUMENTS 5,974,571 A * 10/1999 Riesenman ......... G06F 13/1626
                                                          714/47.1
9,892,482 B2 * 2/2018 You .......................... G06F 9/545
(Continued)

OTHER PUBLICATIONS

H. Lee et al., "A Gpu Kernel Transactionization Scheme for Preemptive Priority Scheduling," 2018 IEEE Real-Time and Embedded Technology and Applications Symposium (RTAS), Porto, Portugal, 2018, 11 pages.
(Continued)

*Primary Examiner* — Joni Hsu
(74) *Attorney, Agent, or Firm* — NICHOLSON DE VOS WEBSTER & ELLIOTT LLP

(57) ABSTRACT

Technology to program graphics processing unit (GPU) command buffers can include a processor and memory storing instructions which, when executed, cause the processor to compile a source file to generate a command list, where the command list includes hardware-specific executable commands for a GPU, and dispatch the command list to a command buffer for execution by the GPU. The command list can be dispatched via an application programming interface (API) call to a graphics driver, where the API call bypasses generating GPU commands for the command list and the graphics driver bypasses encoding the hardware-specific executable commands in the command list. Source files can include function calls specific to GPU hardware blocks, where the command list includes executable commands directed to the GPU hardware blocks based on the function calls. The command list can include an executable loop command, an executable conditional branch command, and/or an executable jump command.

22 Claims, 37 Drawing Sheets

(51) Int. Cl.
*G06F 9/30* (2018.01)
*G06F 9/32* (2018.01)
*G06F 9/48* (2006.01)
*G06F 9/54* (2006.01)
*G06T 1/20* (2006.01)
*G06T 1/60* (2006.01)
*G06T 15/00* (2011.01)

(56) References Cited

U.S. PATENT DOCUMENTS

| | | | |
|---|---|---|---|
| 10,437,637 B1 | 10/2019 | Koneru et al. | |
| 11,354,267 B1* | 6/2022 | Shah | G06F 8/41 |
| 2015/0221059 A1* | 8/2015 | Baker | G06T 1/20 |
| | | | 345/522 |
| 2017/0061569 A1* | 3/2017 | Sathe | G06T 1/60 |
| 2018/0307487 A1* | 10/2018 | Maiyuran | G06F 9/30058 |
| 2020/0174707 A1* | 6/2020 | Johnson | G06F 12/0207 |

OTHER PUBLICATIONS

Extended European Search Report in Application No. 22198988.2 mailed Mar. 3, 2023.
M. Mrozek et al., "GPU Daemon—Road to Zero Cost Submission", Apr. 19, 2016, 4 pages.
M. Mrozek et al. "GPU Daemon—Road to Zero Cost Submission", PowerPoint Presentation, 2016, 28 pages.
Khronos Group, "The OpenCL Specification", Jul. 21, 2015, 288 pages.

* cited by examiner

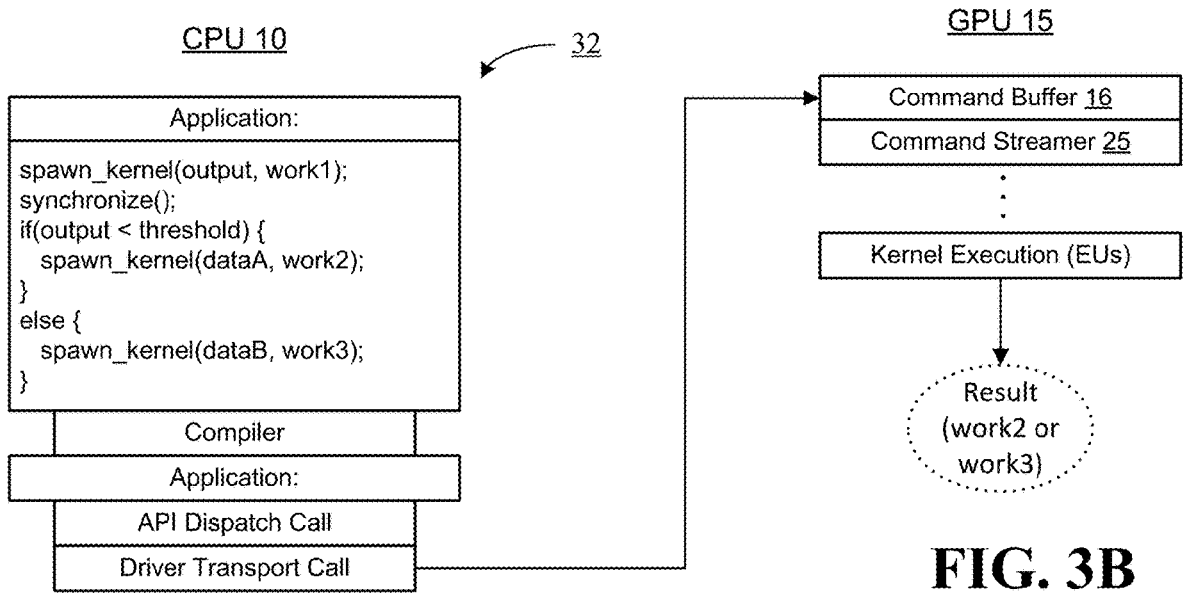
FIG. 3A
FIG. 3B
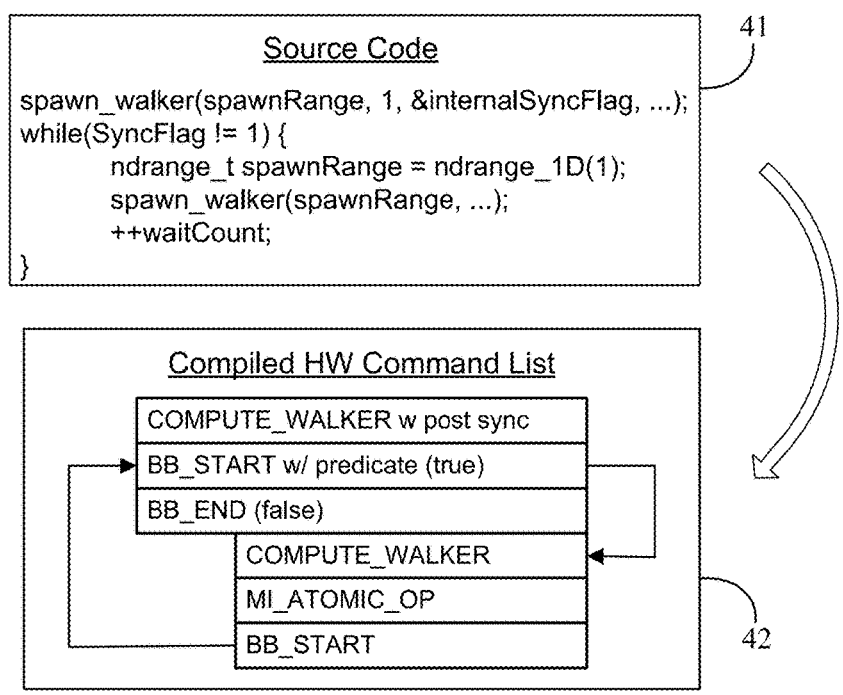
FIG. 4

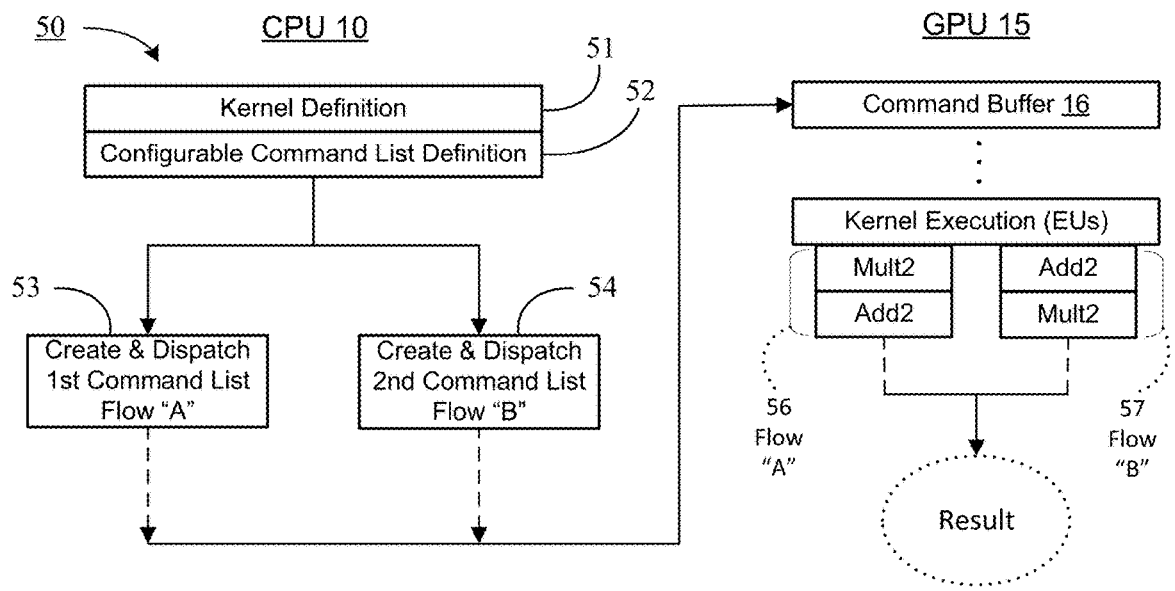

FIG. 5A

```
_kernel void Add2(int *dst, int *src) {
    int gid = get_gid();
    dst[gid] = src[gid] + 2;
}

_kernel void Mult2(int *dst, int *src) {
    int gid = get_gid();
    dst[gid] = src[gid] * 2;
}
```
51A

FIG. 5B

```
trinity_flow void workload_one_sync_two(kernel_t one, kernel_t two, int *src, int *dst,
size_t size) {
    engine_t default_engine= get_default_engine();
    scratch_memory int tmp[size * sizeof(int)];
    size_t gws =size * sizeof(int);
    kernel_ dispatch dispatch(gws, 0);
    kernel_arg args_one(tmp, src);
    kernel_start(default_engine, one, dispatch, args_one);
    barrier( default_engine);
    kernel_arg args_two(dst, tmp);
    kernel_start(default_engine, two, dispatch, args_two);
    barrier( default_engine);
    flush_ cache( default_engine);
}
```
52A

FIG. 5C

```
ze_kernel_handle_t kernelMult2;
ze_kernel_handle_t kernelAdd2;
...
trinity_binary deviceFlow = trinity_create_trinity_object_with_source(trinityProgram);
trinity_set_default_engine(deviceFlow, cmdQueue);
...

//first command list will execute multiply first, then add         53B
trinity_set_symbol_value(deviceFlow, "one", &kernelMult2);
trinity_set_symbol_value(deviceFlow, "two", &kernelAdd2);

//bake all ISA on all levels and store in zebin like format
trinity_build_trinity_flex_binary(deviceFlow, nullptr);

trinity_get_command_list_binary(deviceFlow, "workload_one_sync_two", &cmdListSize,
&cmdListData);

ze_command_list_handle_t firstMulSecondAddlist;
ze_result result = zeCommandListCreate(context, device, &firstMulSecondAdd,
&firstMulSecondAddlist);

//L0 extension to import trinity binary fully backed for all symbols
trinity_zeCommandListImportBinary(firstMulSecondAddList, cmdListSize, cmdListData);
zeCommandListClose(firstMulSecondAddList);
```

```
//second command list will execute add first, then multiply         54B
trinity_set_symbol_value(deviceFlow, "one", &kernelAdd2);
trinity_set_symbol_value(deviceFlow, "two", &kernelMult2);

//bake all ISA on all Levels and store in zebin Like format
trinity_build_trinity_flex_binary(deviceFlow, nullptr);

trinity_get_command_list_binary(deviceFlow, "workload_one_sync_two", &cmdListSize,
&cmdListData);

result = zeCommandListCreate(context, device, &firstAddSecondMul,
&firstAddSecondMulList);

//L0 extension to import trinity binary fully backed for all symbols
trinity_zeCommandListImportBinary(firstAddSecondMulList, cmdListSize, cmdListData);
zeCommandListCLose(firstAddSecondMulList);
```

```
const int block_size = 128
_kernel void Add2(int *dst, int *src, int block) {
    int gid = get_gid();
    dst[gid + block * block_size] = src[gid + block * block_size] + 2;
}

_kernel void Mult2(int *dst, int *src, int block) {
    int gid = get_gid();
    dst[gid + block * block_size] = src[gid + block * block_size] * 2;
}
```

```
global int stop= 0;
global event_t signal_consumer;
global event_t signal_producer;
const int block_size = 128;
trinity_flow void producer(engine_t producer, kernel_t producer_kernel, int *prod_src,
        int *prod_dst, size_t size) {
    stop = 0;

size_t gws = block_size;
    kernel_dispatch dispatch(gws, 0);

int blocks = size / block_size;
    For(int i = 0; i < blocks; i++) {
        kernel_arg args(prod dst, prod_src, i);
        kernel_start(producer, producer_kernel, dispatch, args);
        barrier(producer);
        signal_event(producer, signal_consumer);
        wait_event(producer, signal_producer);
    }
    stop = 1;
    flush_cache(producer);
    signal_event(producer, signal_consumer);
}
```

```
trinity_flow void consumer(engine_t consumer, kernel_t consumer_kernel, int *cons_src,
        int *cons_dst, size_t size) {
    size_t gws = block_size;
    kernel_dispatch dispatch(gws, 0);

int order = 0;
    while(1) {
        wait_event(consumer, signal_consumer);
        if(stop) {
            flush_ cache(consumer);
            break;
        }
        kernel_arg args(cons_dst, cons_src, order);
        kernel_start(consumer, consumer_kernel, dispatch, args);
        barrier(consumer);
        ++order;
        signal_event(consumer, signal_producer);
    }
}
```

FIG. 6D

```
ze_command_queue_handle_t cmdQueueProducer;
cmdQueueProducerDesc.mode = ZE_COMMAND_QUEUE_MODE_ASYNCHRONOUS;
zeCommandQueueCreate(context, device, &cmdQueueProducerDesc, &cmdQueueProducer);

ze_command_queue_handle_t cmdQueueConsumer;
cmdQueueConsumerDesc.mode = ZE_COMMAND_QUEUE_MODE_ASYNCHRONOUS;
zeCommandQueueCreate(context, device, &cmdQueueConsumerDesc,
&cmdQueueConsumer);

trinity_binary deviceFlow = trinity_create_trinity_object_with_source(trinityProgram);
trinity_set_symbol_value(deviceFlow, "producer", &cmdQueueProducer);
trinity_set_symbol_value(deviceFlow, "consumer", &cmdQueueConsumer);
trinity_set_symbol_value(deviceFlow, "consumer_kernel", &kernelMult2);
trinity_set_symbol_value(deviceFlow, "producer_kernel", &kernelAdd2);
trinity_build_trinity_flex_binary(deviceFlow, nullptr);

trinity_get_command_list_binary(deviceFlow, "producer", &prodCmdListSize,
&prodCmdListData);

ze_result_t ze_result = zeCommandListCreate(context, device, &prodListDesc, &prodList);
trinity_zeCommandListImportBinary(prodList, prodCmdListSize, prodCmdListData);

trinity_get_command_list_binary(deviceFlow, "consumer", &consCmdListSize,
&consCmdListData);

ze_result = zeCommandListCreate(context, device, &consListDesc, &consList);
trinity_zeCommandListImportBinary(consList, consCmdListSize, consCmdListData);

zeCommandQueueExecuteCommandLists(cmdQueueProducer, 1, &prodList, nullptr);
zeCommandQueueExecuteCommandLists(cmdQueueConsumer, 1, &consList, nullptr);

zeCommandQueueSynchronize(cmdQueueProducer, 10);
zeCommandQueueSynchronize(cmdQueueConsumer, 10);
```

```
_kernel void factorial(int *dst, int *src, int factor) {
    int gid = get_global_id(0);
    int tmp = src[gid];
    for(int i = 1; i <factor; i++) {
        tmp *= (i+1);
    }
    dst[gid] = tmp;
}
```

```
global event_t signal_compute;
global event_t signal_results;

trinity_flow void copy_and_compute(engine_t compute, engine_t copy,
kernel_t compute_kernel, int *device_src, int *device_dst, int *host_src,
        int *host_dst, int free_param, size_t size) { int pattern = 0;
  dispatch_fill(copy, device_dst, &pattern, sizeof(pattern));
  dispatch_copy(copy, host_src, device_src, signal_compute);

size_t gws =size;
  kernel_dispatch dispatch(gws, 0);
  kernel_arg args(device_dst, device_src, free_param);

wait_event( compute, signal_compute);
  kernel_start(compute, compute_kernel, dispatch, args);
  signal_event(compute, signal_results);

wait_event(copy, signal_results);
  dispatch_copy(copy, device_dst, host_dst);
}
```

```
ze_command_queue_handle_t cmdQueueCompute;
cmdQueueComputeDesc.ordinal = 0;
cmdQueueComputeDesc.mode = ZE_COMMAND_QUEUE_MODE_ASYNCHRONOUS;
zeCommandQueueCreate(context, device, &cmdQueueComputeDesc, &cmdQueueCompute);

ze_command_queue_handle_t cmdQueueCopy;
cmdQueueCopyDesc.ordinal = 1;
cmdQueueCopyDesc.mode = ZE_COMMAND_QUEUE_MODE_ASYNCHRONOUS;
zeCommandQueueCreate(context, device, &cmdQueueCopyDesc, &cmdQueueCopy);

ze_event_pool_desc_t eventPoolDesc = {ZE_STRUCTURE_TYPE_EVENT_POOL_DESC, nullptr,
0, 2};
ze_event_pool_handle_t eventPool{};
zeEventPoolCreate(context, &eventPoolDesc, 0, nullptr, &eventPool);

eventDescSignalCompute = {ZE_STRUCTURE_TYPE_EVENT_DESC, nullptr, 0,
ZE_EVENT_SCOPE_FLAG_DEVICE, ZE_EVENT_SCOPE_FLAG_DEVICE};
ze_event_handle_t eventSignalCompute{};
zeEventCreate(eventPool, &eventDescSignalCompute, &eventSignalCompute);

ze_event_desc_t eventDescSignalResults = {ZE_STRUCTURE_TYPE_EVENT_DESC, nullptr, 1,
ZE_EVENT_SCOPE_FLAG_DEVICE, ZE_EVENT_SCOPE_FLAG_DEVICE};
ze_event_handle_t eventSignalResults{};
zeEventCreate(eventPool, &eventDescSignalResults, &eventSignalResults);

trinity_set_symbol_value(deviceFlow, "compute", &cmdQueueCompute);
trinity_set_symbol_value(deviceFlow, "copy", &cmdQueueCopy);
trinity_set_symbol_value(deviceFlow, "signal_compute", &eventSignalCompute);
trinity_set_symbol_value(deviceFlow, "signal_results", &eventSignalResults);
trinity_set_symbol_value(deviceFlow, "compute_kernel", &kernelFactorial);   ── 73B trinity_get_command_list_binary(deviceFlow, "copy_and_compute#compute",
&computeCmdListSize, &computeListData);
trinity_get_command_list_binary(deviceFlow, "copy_and_compute#copy",
©CmdListSize, ©ListData);
```

81 — Compile a source file to generate a command list, where the command list comprises a set of hardware-specific executable commands for a GPU;

82 — Dispatch the command list to a command buffer for execution by the GPU

84 — Dispatch the command list via an API call to a graphics driver

85 — The API is to bypass generating GPU commands for the command list, and the graphics driver is to bypass encoding the hardware-specific executable commands in the command list

87 — Store the command list

88 — Retrieve the command list from storage prior to dispatching the command list to the command buffer

FIG. 8C

GRAPHICS PROCESSOR INSTRUCTION FORMATS
700

——————————— 128-BIT INSTRUCTION ———————————
710

| OPCODE 712 | CONTROL 714 | EXEC-SIZE 716 | DEST 718 | SRC0 720 | SRC1 722 | SRC2 724 | ACCESS/ADDRESS MODE 726 |

64-BIT COMPACT INSTRUCTION
730

| OPCODE 712 | INDEX 713 | CONTROL 714 | DEST 718 | SRC0 720 | SRC1 722 |

OPCODE DECODE
740

| 7 | 6 | 5 | 4 | 3 | 2 | 1 | 0 |

Miscellaneous - 746 opcode=000xxxxxb ← Move/Logic - 742 opcode=0010xxxxb ← Miscellaneous - 746 opcode=0011xxxxb ← Flow Control - 744 opcode=0100xxxxb ← Parallel Math - 748 opcode=0101xxxxb ← Vector Math - 750

FIG. 16

FIG. 18A  GRAPHICS PROCESSOR COMMAND FORMAT 900

| CLIENT 902 | OPCODE 904 | SUB-OPCODE 905 | DATA 906 | COMMAND SIZE 908 |

FIG. 18B  GRAPHICS PROCESSOR COMMAND SEQUENCE 910

PIPELINE FLUSH 912
↓
PIPELINE SELECT 913
↓
PIPELINE CONTROL 914
↓
RETURN BUFFER STATE 916
↓
Pipeline? 920
— 922 3D →  3D PIPELINE STATE 930 → 3D PRIMITIVE 932 → EXECUTE 934
— 924 Media → MEDIA PIPELINE STATE 940 → MEDIA OBJECT 942 → EXECUTE 944

PROGRAMMABLE GPU COMMAND BUFFERS USING MUTABLE COMMAND LISTS

TECHNICAL FIELD

Embodiments generally relate to graphics processing devices. More particularly, embodiments relate to programming graphics processing unit (GPU) command buffers.

BACKGROUND

Modern compute application programming interfaces (APIs), such as OpenCL, provide very limited building blocks that can be used to program command buffers. Such APIs do not utilize the full capabilities of GPU hardware command streamers (which are consumers of command buffers). This severely limits the ability to program GPUs, particularly in terms of advanced or fine-tuned scheduling models. For example, even routine compute tasks can require multiple roundtrips between a host central processing unit (CPU) and GPU, resulting in excessive wait times, delays and traffic between CPU and GPU. Furthermore, these limitations leave applications subject to heuristics that happen to be built into a particular GPU driver.

BRIEF DESCRIPTION OF THE DRAWINGS

The various advantages of the embodiments will become apparent to one skilled in the art by reading the following specification and appended claims, and by referencing the following drawings, in which:

FIGS. 3A-3B provide diagrams illustrating improved programming of a GPU command buffer for an example program according to one or more embodiments;

FIG. 4 provides a diagram illustrating an example of a compiled command list according to one or more embodiments;

FIGS. 5A-5E provide diagrams illustrating an example reconfigurable command list according to one or more embodiments;

FIGS. 6A-6E provide diagrams illustrating an example of producer-consumer command lists according to one or more embodiments;

FIGS. 7A-7D provide diagrams illustrating an example of single flow command lists for multiple engines according to one or more embodiments;

FIGS. 8A-8D provide flow charts illustrating example methods of programming a GPU command buffer according to one or more embodiments;

FIG. 16 is a block diagram illustrating an example of a graphics processor instruction formats according to an embodiment;

FIG. 18A is a block diagram illustrating an example of a graphics processor command format according to an embodiment;

FIG. 18B is a block diagram illustrating an example of a graphics processor command sequence according to an embodiment;

DETAILED DESCRIPTION

The improved computing system technology as described herein provides for programming GPU command buffers using complex, mutable command lists. The technology helps improve the overall performance of computing systems by allowing applications to express complex scheduling models to be executed on the GPU by providing complex command lists to as GPU command buffer for processing by GPU command streamers (as consumers of command buffers). The disclosed technology helps in blending the border between compute devices and hosts, allowing program source level creation of complex scenarios and algorithms on multiple levels of execution.

The improved computing system technology uses a new C-like programming language allowing application developers to create source files that, when compiled, produce complex command lists having a set of hardware-specific executable commands for a GPU. This allows an application to dispatch a command list of the executable commands to a GPU command buffer for execution by the GPU. The command list can be a complex, mutable list of hardware instructions for the GPU.

Figure 1A:
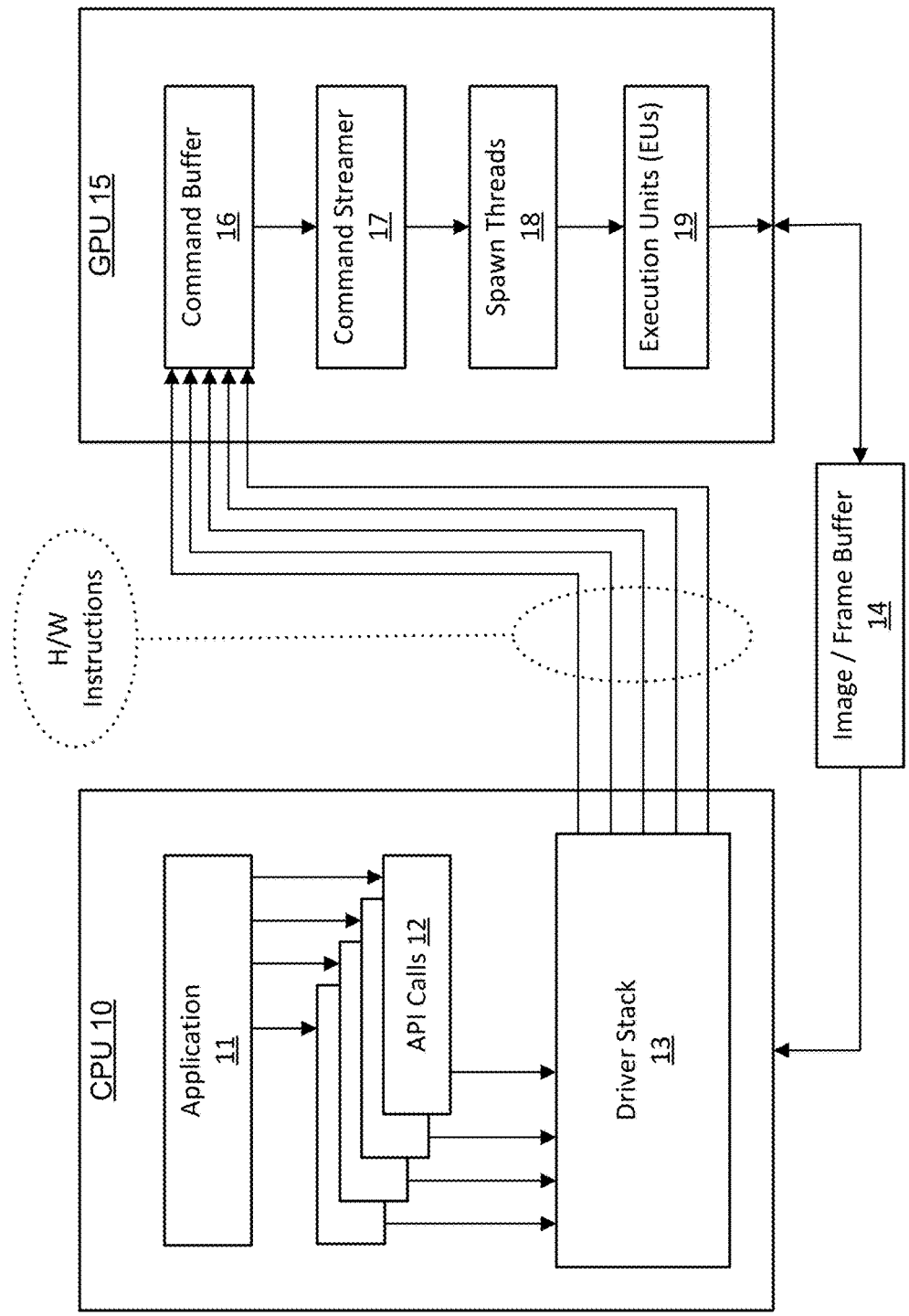
FIGS. 1A-1B provide comparative diagrams illustrating conventional dispatching of commands to a GPU command buffer and improved programming of a GPU command buffer according to one or more embodiments.

FIG. 1A provides a diagram illustrating conventional dispatching of commands to a GPU command buffer in a typical computing system. As shown in FIG. 1A, a computing system includes a host CPU 10 and a GPU 15. The CPU 10 executes an application 11 that includes a series of API calls 12. The API calls 12 may invoke API functions provided by a programming framework such as, e.g., OpenCL. Each function in the application that is intended to generate a GPU-executable hardware instruction typically requires a separate API call 12. Each API call 12 results in a driver call for the driver stack 13, which is a set of one or more drivers specially designed to interface with the specific manufacturer and model of the GPU 15. Each API call 12 to the driver stack 13 results in encoding, by the driver stack 13, one or more hardware-executable instructions for the GPU. Thus, for a given application, the number of hardware hardware-executable instructions generated by the driver stack 13 often differs from the number of API calls 12. It is important to note that the API calls 12 do not themselves provide hardware-executable instructions; rather, the driver stack 13 receives each API call 12 and encodes one or more hardware-executable instructions. The driver stack 13 sends each hardware-executable instruction, individually, to the GPU command buffer 16 for execution by the GPU.

The command buffer 16 is a memory accessible by both the CPU 10 and the GPU 15. The command buffer can reside in, for example, system memory (such as, e.g., system random access memory), or in GPU memory (e.g., GPU device memory), etc. The command buffer 16 can be, e.g., a ring buffer. The command buffer 16 can include one or more individual command buffers 16a, 16b, etc.

The GPU 15 includes a command streamer 17 which fetches hardware instructions(s) from the command buffer 16. Typically, the CPU can indicate to the GPU (e.g., via a GPU register) that hardware instructions have been loaded into the command buffer. Based on the fetched hardware instruction(s), the command streamer 17 causes the GPU to spawn one or more threads 18, which are presented for execution by the kernel/execution units (EUs) 19. (In some GPUs, the execution units 19 can also be known as processing cores.) Results of processing the executed hardware instruction(s) can be loaded into an image or frame buffer 14 (or other memory), which can be accessed by the CPU 10.

Figure 1B:
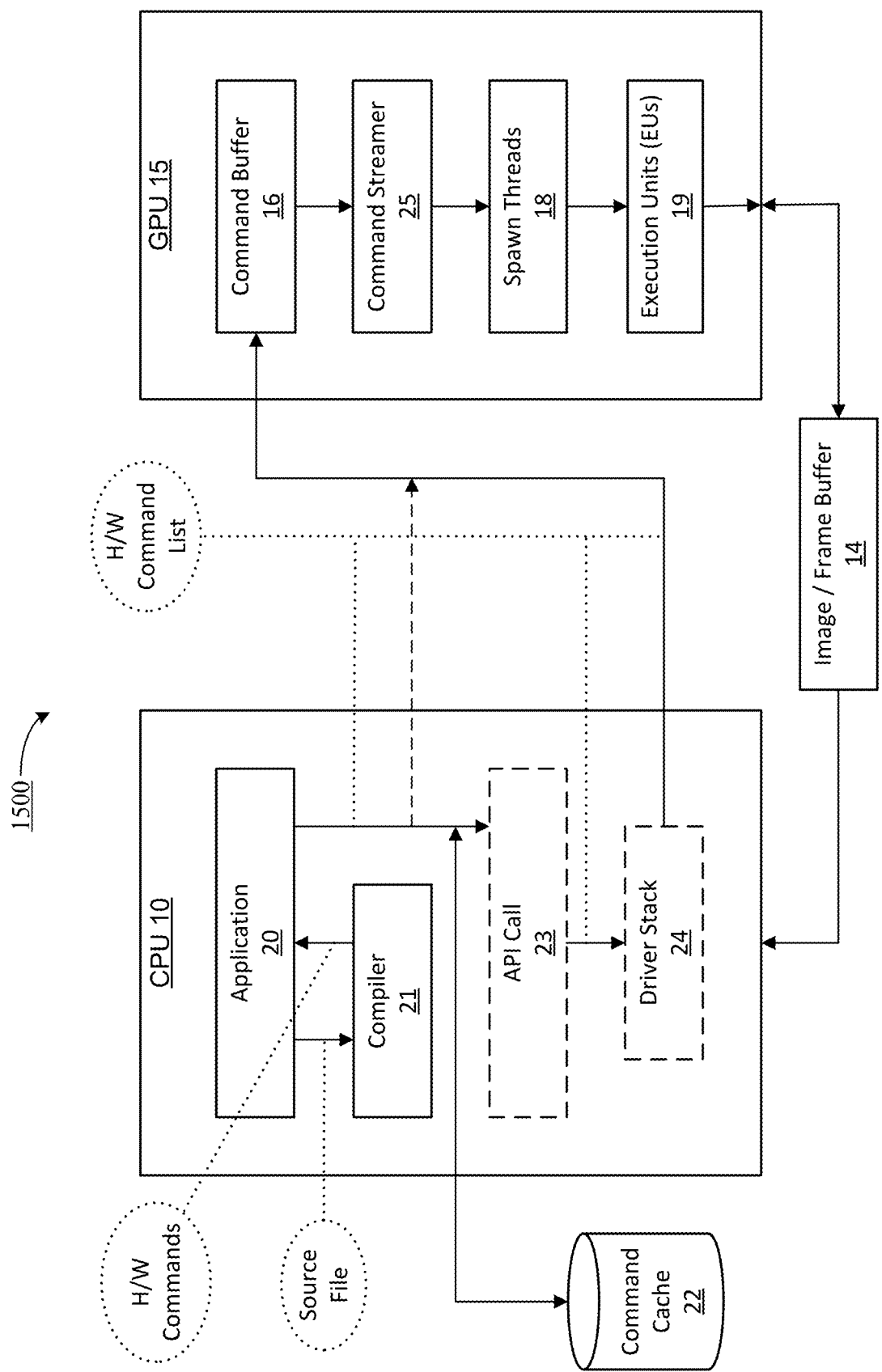

FIG. 1B provides a diagram illustrating improved programming of a GPU command buffer in a computing system 1500 according to one or more embodiments, with reference to components and features described herein including but not limited to the figures and associated description. FIG. 1B illustrates several of the same components and aspects as described with reference to FIG. 1A, which will not be repeated except as necessary to describe the improved technology. As shown in FIG. 1B, the computing system 1500 includes a CPU 10 and a GPU 15 having the features described below. CPU 10 processes an application 20 that includes a source file. The source file includes software code written in a new, C-like language that is specifically designed to generate complex, mutable command lists of executable hardware instructions (i.e., executable hardware commands) specifically to be executed by the GPU without further interpretation or encoding by an API or driver. The source file is compiled with a new compiler 21 that is designed specifically to compile or interpret code written in the new C-like language and generate executable hardware commands that can be used to build a command list to take advantage of functionality of the GPU command streamer 25. The compiler 21 can be based, e.g., on LLVM-Clang compiler technology, and can be used along with user mode driver (UMD) extension to the driver stack 24. A UMD extension provides information about the hardware device for which the compiler is to generate command lists and mechanisms for loading compiled command lists into GPU memory.

The C-like programming language provides for source code that keeps abstract representations of GPU hardware blocks like engines (equivalent of command streamers), kernels (kernel, compute or any other shader—equivalent of execution on EU threads), global and local memory. It also provides C-style language syntax as program arguments, fixed functions and built-in functions that are proxies for complex programming usually implemented in the driver. Command lists created within C-like source code can be implicit and/or explicit. Explicit command lists explicitly express target engine via source code syntax, while implicit command lists have source code syntax to imply use of default engine. Command lists can be created and built from source and later patched using defined symbols and relocations. All metadata about symbols, required allocations (heaps, command buffers, binary shader executables for GPU threads), engines (and their properties), kernels, etc. can be passed using any methods for passing metadata information.

Once the source file is compiled, the application 20 can use the resulting hardware commands to build one or more command lists which contain a series of hardware-executable instructions that are specific to the GPU 15. Once the command list(s) are built, the CPU 10 can (via the application 20 or another application)) dispatch the command list(s) to the command buffer 16. The CPU 10 can also store the command list(s) in a command cache 22, for later recall and use by the application 20 (or another application). Optionally, the application 20 can dispatch the command list(s) to the command buffer 16 via a single API call 23. The API dispatch call 23, which can be based on a programming framework such as the Intel® Level Zero framework, in turn invokes a driver transport call to the driver stack 24. The driver stack 24 then sends the command list(s) to the command buffer 16. It is important to note that the API call 23 merely invokes a driver transport call to the driver stack 24, which merely engages the driver stack 24 as a transport mechanism to load the command list(s) into the command buffer 16. The API does not generate or encode GPU instructions for the command list, and the driver stack 24 does not encode any of the hardware instructions in the command list(s) into executable commands for the GPU 15; the instructions in the command list(s) are already in hardware-executable form for the GPU 15 when the command list(s) are built by the application 20. Thus, the API (including the API call 23) is to bypass generating GPU commands for the command list, and the graphics driver stack 24 is to bypass encoding the hardware-specific executable commands in the command list.

The GPU 15 includes a command streamer 25 which is a consumer of the command list(s) that have been dispatched to the command buffer 16. The command streamer 25 is responsible for dispatching and spawning EU threads, and includes certain advanced capabilities including, for example, the ability to spawn complex tasks with conditional execution flow, loops, jumps, arithmetical and atomic operations, etc. The new C-like programming language generates command lists described herein that can take advantage of the advanced capabilities of the command streamer 25 by including complex hardware instructions such as, e.g., loop commands, conditional branch commands, jump commands, and/or wait commands. Command streamers having advanced capabilities such as these are available in certain GPUs including, e.g., Intel® GPU products. GPUs can have several command streamers. Different command streamers handle different hardware aspects of a GPU. Some hardware commands such as, e.g. atomic operations and memory read/write operations can be executed by all of the command streamers. Some hardware commands are specific to the type of command streamer. For example, a compute command streamer can spawn compute threads; a copy command streamer can perform memory transfers between GPU device memory and CPU system memory (which enables a compute command streamer to perform other dedicated tasks); and a media command streamer can execute video encoding/decoding specific tasks. Command streamers can also be known by other names such as, e.g., shader engine, multimedia engine, display engine, etc.

Thus, the command list(s) that are built by the application 20 and dispatched to the command buffer 16 can include complex executable hardware instructions (such as, e.g., one or more of an executable loop command, an executable conditional branch command, and/or an executable jump command) that are specific to the GPU 15 and take advantage of these advanced capabilities of the command streamer 25. Such complex hardware instructions are generated by the compiler 21 based on the new C-like language. Current API programming frameworks, such as OpenCL, Level Zero, or Vulkan, do not include the capability for generating such complex hardware instructions and, thus, current applications using OpenCL or similar programming frameworks cannot take advantage of these advanced command streamer capabilities.

Some or all components and/or features in the system 1500 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the system 1500 can be implemented in one or more modules as a set of program or logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the system 1500 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figures 2A, 2B:
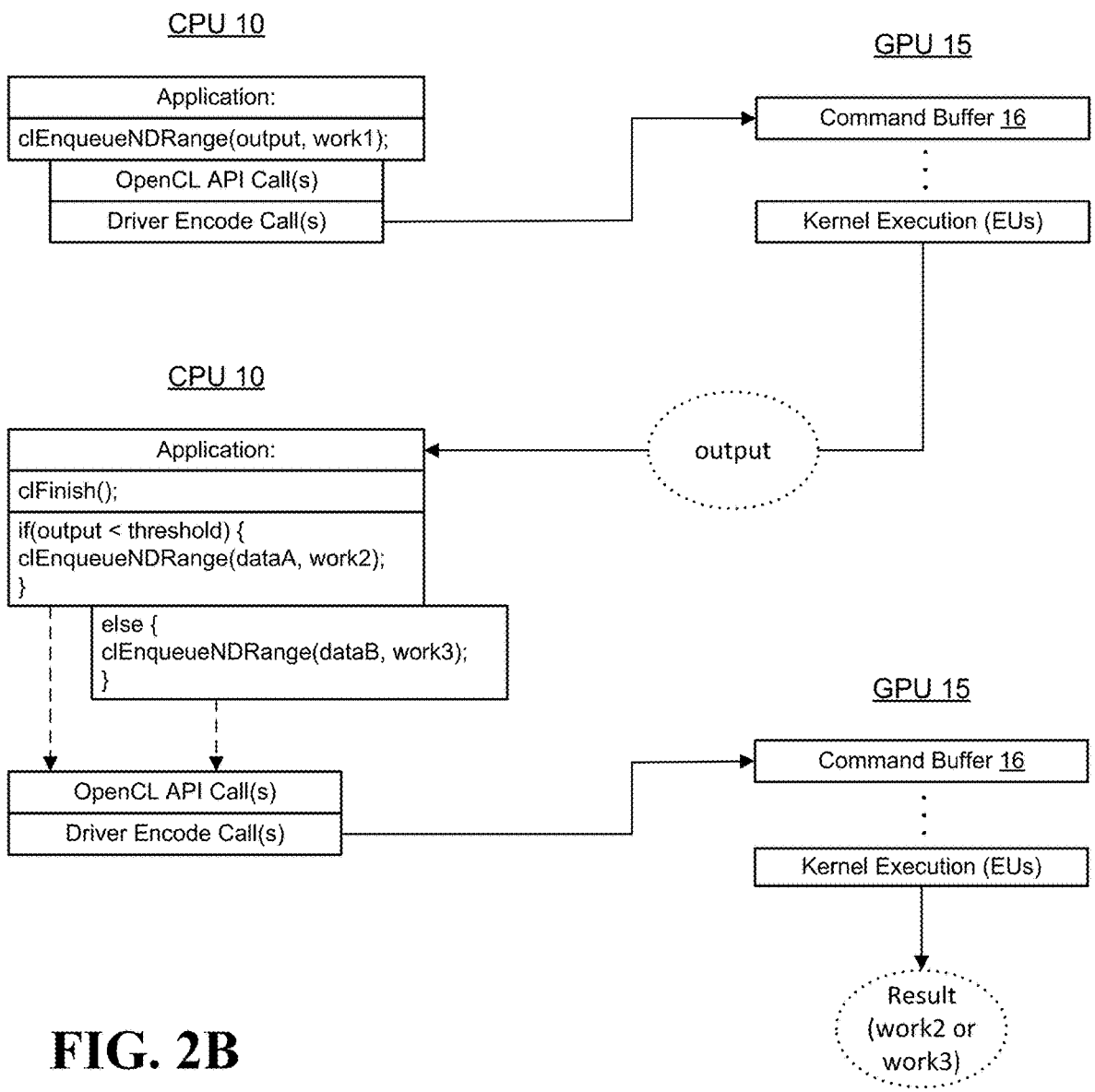
FIGS. 2A-2B provide diagrams illustrating conventional programming of a GPU command buffer for an example program.

FIGS. 2A-2B provide diagrams illustrating conventional programming of a GPU command buffer for an example program. Typical OpenCL programs send workloads from the CPU to the GPU in as serialized manner with host-side control flow. In FIG. 2A is shown example program code 27, based on OpenCL. The program code 27 is designed to execute a first workload (work1) on the GPU and, based on the output, execute a second workload (work2) on the GPU if the output of the first workload is less than a threshold, otherwise execute a third workload (work3) on the GPU if the output of the first workload is greater than or equal to the threshold.

FIG. 2B illustrates a conventional control flow 28 for executing the program 27. Based on the first line of the code 27, the application running on CPU 10 makes one or more OpenCL API call(s) and corresponding driver encode calls to send hardware instructions for the workload work1 to the GPU command buffer 16. The number of OpenCL API call(s) and corresponding driver encode calls can depend on the nature of the workload. The host CPU 10 then waits for the GPU 15 to execute the workload work1. Once the GPU 15 executes the workload work1 the results of work1 (output) are provided to the CPU 10.

Next, the application running on the CPU 10 executes the finish command and then resolves the if . . . else instructions to determine whether to send the second workload work 2 or the third workload work 3 to the GPU 15. If the condition is met—i.e., the output is less than the threshold, the CPU 10 executes OpenCL and driver encode calls to send the second workload work 2 to the GPU 15. Otherwise, the CPU 10 executes OpenCL and driver encode calls to send the third workload work 3 to the GPU 15. In either case, the execution of work1 and the conditional execution of work2 or work3 (depending on the results of work1) requires multiple round trips between the host CPU and the GPU.

FIGS. 3A-3B provide diagrams illustrating improved programming of a GPU command buffer for an example program according to one or more embodiments, with reference to components and features described herein including but not limited to the figures and associated description. Turning to FIG. 3A, shown is example pseudo program code 30, which is illustrative of the new C-like programming language. By using the new language and compiler technology, application programs can send workloads from the CPU to the GPU in a single command list with control flow governed by the executed command list, thus eliminating multiple CPU-GPU round trips. The pseudo code 30 is designed for the GPU to execute a first workload (work1) and, based on the output, execute a second workload (work2) if the output of the first workload is less than a threshold, otherwise execute a third workload (work3).

FIG. 3B illustrates an improved control flow 32 for executing the pseudo program 30. Using the new compiler technology, the application on CPU 10 generates a command list which incorporates all of the features of the program 30, including execution of the workload work 1, determining whether the output of work1 is less than the threshold, and then conditionally executing either the second workload work2 or the third workload work3 based on the threshold determination. The application can make a single API dispatch call and a driver transport call to send the command list as a single batch of hardware-executable instructions to the command buffer 16. The GPU 15, via the capabilities of the command streamer 25 (including the ability to execute if . . . else programming constructs), executes the hardware instructions in the command list and provides the results— based on execution of work2 or work3, the execution of which depends, in turn, on the output of work1.

FIG. 4 provides a diagram illustrating an example of a compiled command list according to one or more embodiments, with reference to components and features described herein including but not limited to the figures and associated description. Pseudo source code 41 is a representative example of source code to be compiled by the compiler 21 (FIG. 1B, already discussed). When the pseudo source code 41 is compiled by the compiler 21, the compiler 21 generates a compiled set of hardware-executable commands for a command list 42.

The example pseudo source code 41 includes examples of new built-in functions, further illustrative of the new C-like programming language and types. For example, "spawn_walker( )" is a built-in function used for executing compute kernels on the GPU. The compiler 21 translates the C-like function spawn_walker( ) into a GPU executable hardware command COMPUTE_WALKER. "COMPUTE_WALKER" is an example of a GPU executable command for Intel® GPUs that instructs the GPU to spawn GPU threads on GPU executable units (EUs) and execute a specific kernel (i.e., compute shader) on them. "ndrange_t" is a built-in type (similar to OpenCL) that specifies execution parameters for a kernel, like global work-group size, local work-group size, number of work-groups.

The command list 42 illustrates examples of GPU executable commands that can be compiled by the compiler 21 based on the pseudo code 41 and sent to the command buffer 16 for execution by the GPU 15. In addition to the COMPUTE_WALKER command, the command list 42 includes several other examples of GPU hardware commands, as follows.

"BB_START w/predicate" is a jump instruction, where the "predicate" option is a configurable (during command list execution) flag that can be switched on or off at runtime to cause the command to execute (when "true") or pass (when "false"). In the example shown, when "predicate" is "true" it means BB_START will jump to the next "COMPUTE_WALKER" and will execute the next kernel. This corresponds to the "while(SyncFlag !=1)" loop condition in the pseudo source code 41.

"BB_END" is an end instruction that instructs the GPU to return control from this command list to the upper command buffer; this typically means a return to the KMD ring buffer. This instruction will be executed when "predicate" is set to "false," such that "BB_START w/ predicate" will not jump to "COMPUTE_WALKER."

"MI_ATOMIC_OP" corresponds to "++waitCount" in the pseudo source code 41.

"BB_START" is an implementation of the loop and jumps to the "BB_START w/predicate." A calculation of "predicate" is not shown in the illustrated example, but corresponds to the value of the "while(SyncFlag !=1)" loop condition. The variable "SyncFlag" can be changed in the kernel itself or by using the output from the "waitCount," and can be implemented, e.g., by different hardware commands or by the result of the execution of the kernel.

FIGS. 5A-5E provide diagrams illustrating an example reconfigurable command list according to one or more embodiments, with reference to components and features described herein including but not limited to the figures and associated description. Turning to FIG. 5A, an example control flow 50 for reconfigurable command list generation and execution is shown. Label 51 of the illustrated example references the code definition for the kernel to be executed, which in the example includes two functions, an addition function (named Add2) and a multiplication function (named Mult2). Label 52 of the illustrated example references the code definition for the reconfigurable and implicit command list, which in the example can be compiled to generate commands to execute the kernel functions in flow order "A" (multiply first, then add) or to execute the kernel functions in flow order "B" (add first, then multiply). At label 53, the kernel code definition and the command list definition for flow order "A" is compiled by the compiler 21 to generate a first command list for flow "A" which is then dispatched by the CPU 10 to the command buffer 16. The GPU 15, via the capabilities of the command streamer 25 (not shown in FIG. 5A), causes the hardware instructions in the first command list (flow order "A") to be executed via the EUs, which in turn at label 56 execute the two kernel functions in flow order "A" (multiply then add), and the results are collected in memory.

Through relatively minor changes in the command list definition code, the flow order can be changed to flow "B" (add first, then multiply). At label 54, the kernel code definition and the command list definition for flow order "B" is compiled by the compiler 21 to generate a second command list for flow "B" which is then dispatched by the CPU 10 to the command buffer 16. The GPU 15, via the capabilities of the command streamer 25, causes the hardware instructions in the second command list (flow order "B") to be executed via the EUs, which in turn at label 57 execute the two kernel functions in flow order "B" (add then multiply), and the results are collected in memory.

Example pseudo code for the reconfigurable command list example of FIG. 5A is shown in FIGS. 5B-5E, which are further illustrative of the new C-like programming language and types. FIG. 5B illustrates example pseudo code 51A for the kernel definition (referenced at label 51 in FIG. 5A, already discussed). The pseudo code 51A defines two kernel functions, Add2( )—which takes a value from src[gid] and adds 2 to the value, and Mult2( )—which takes a value from src[gid] and multiplies the value by 2. The identifier gid is the unique identifier of each work-item. The multiply and add functions in the kernel definition code 51A can be compiled to provide the hardware instructions that implement mathematic instructions for multiplication and addition.

FIG. 5C illustrates example pseudo code 52A for the command list definition (referenced at label 52 in FIG. 5A, already discussed). In the illustrated example, the command list is identified by the name "workload_one_sync_two." The pseudo code 52A includes built-in functions that are compiled to single or multiple hardware commands that are to be executed under the direction of the command streamer 25. As shown in FIG. 5C, the built-in functions include the following examples:

"kernel_start( )"—which corresponds to the hardware command COMPUTE_WALKER (as discussed above, COMPUTE_WALKER is an example of a GPU-executable command for Intel® GPUs that starts a compute shader or kernel);

"barrier( )"—which corresponds to the hardware command PIPE_CONTROL (PIPE_CONTROL is an example of a GPU-executable command for Intel® GPUs that can stall the GPU engine and/or cause GPU caches to flush, e.g. in order to be visible by the CPU); and "flush_cache( )"—which corresponds to the hardware command PIPE_CONTROL with cache flushes (additional flags can force the abovementioned cache flush operation).

Other functions and data structures shown in the example code of FIG. 5C can retrieve generic symbols (e.g., software objects) or are used to organize dispatching of hardware commands, such as the following examples:

"get_default_engine( )"—retrieves a symbol (such as an API command queue object) that represents the command streamer; this provides the ability for the compiler to create command lists with different hardware instructions that are specific to the type of engine; for example, if the default engine assigned is a copy engine (e.g., during host-side configuration of the code), then the compiler will use different hardware commands to create a command list than would be used if the default engine assigned is a compute engine or a render engine;

"scratch_memory"—provides an implicit staging buffer that is placed in system or local memory; scratch memory as a built-in type is a software abstract object that can be implicitly assigned to internal allocation (during compilation time); for example, a UMD extension as a part of the driver stack 24 can handle creation of scratch memory, where the compiler can pass information in the binary meta-data format;

"kernel_dispatch"—retrieves parameters for COMPUTE_WALKER and per-thread data—including, e.g., number of threads, number of dimensions, number of work groups and work group sizes, indirect heap (for runtime information for the given kernel), ISA allocation, other heaps as required, etc.;

"kernel_args"—provides arguments to be used by the given kernel, can be embedded into kernel payload data as cross-thread data (indirect heap).

FIG. 5D illustrates example pseudo code 53A for creating the first command list with flow order "A" (referenced at label 53 in FIG. 5A, already discussed). As discussed with FIG. 5A and illustrated in the pseudo code 53A, the first command list is to execute the multiply kernel and then the addition kernel. The example pseudo code 53A includes several Level Zero function calls (that begin with "ze" prefix), as the Level Zero framework includes functionality useful for building and sending command lists for programming command buffers. For example, Level Zero through the UMD extension can allocate resources (like heaps, ISA, command buffers, scratch memory) on behalf of the compiled program, and patch data (e.g., write actual values, like graphics addresses) into heaps and command buffers. This can be done during parsing the command list binary by the UMD extension as it reads command list meta-data. The pseudo code 53A also includes new example functions (beginning with "trinity" prefix), such as:

trinity_set_default_engine( ), trinity_set_symbol_value( )—these trinity functions support the concept of symbols and mutable command lists, such that the same definition of flow can be reused after assigning different objects to symbols; they are comparable to setKernelArg( ) in Level Zero or OpenCL; in the present example of FIG. 5D, when compiled by compiler 21, the calls to trinity_set_symbol_value( ) (labeled as 53B in FIG. 5D) set the order flow for the first command list—multiply (Mult2) first, then add (Add2);

trinity_build_trinity_flex_binary( )—this is a building function to prepare a ready to import command list object; it performs compilation of GPU hardware command streamer commands based on a type of engine, patches necessary heaps, and also compiles kernels as needed (which can be provided as source code or binary representation); this function is comparable to clBuildProgram( ) in OpenCL;

trinity_get_command_list_binary( )—this function is to retrieve an implicit command list with all explicit and implicit objects, programmed command buffers, kernels and their heaps; the implicit command list in this example uses name of the flow "workload_one_sync_two"; this function is comparable to clCreateKernel( ) in OpenCL or zeCreateKernel( ) in Level Zero.

Other functions can be defined in pseudo code, such as, e.g., "trinity_create_trinity_object_with_source( )" (the variable "trinityProgram" can represent the pseudo source code of FIG. 52A, already discussed)—this function is comparable to OpenCL function clCreateProgramWithSource( ), but performed on a command buffer defined in the "workload_one_sync_two" function.

FIG. 5E illustrates example pseudo code 54A for creating the second command list with flow order "B" (referenced at label 54 in FIG. 5A, already discussed). As discussed with FIG. 5A and illustrated in the pseudo code 54A, the second command list is to execute the addition kernel and then the multiply kernel. The example pseudo code 54A can, e.g., be substituted for the code outlined in dotted lines in FIG. 5D.—thus demonstrating how the command list reconfiguration can be accomplished on the host side. In the present example of FIG. 5E, when compiled by compiler 21, the calls to trinity_set_symbol_value( ) (labeled as 54B in FIG. 5E) set the order flow for the second command list—add (Add2) first, then multiply (Mult2).

Figures 6A, 6B:
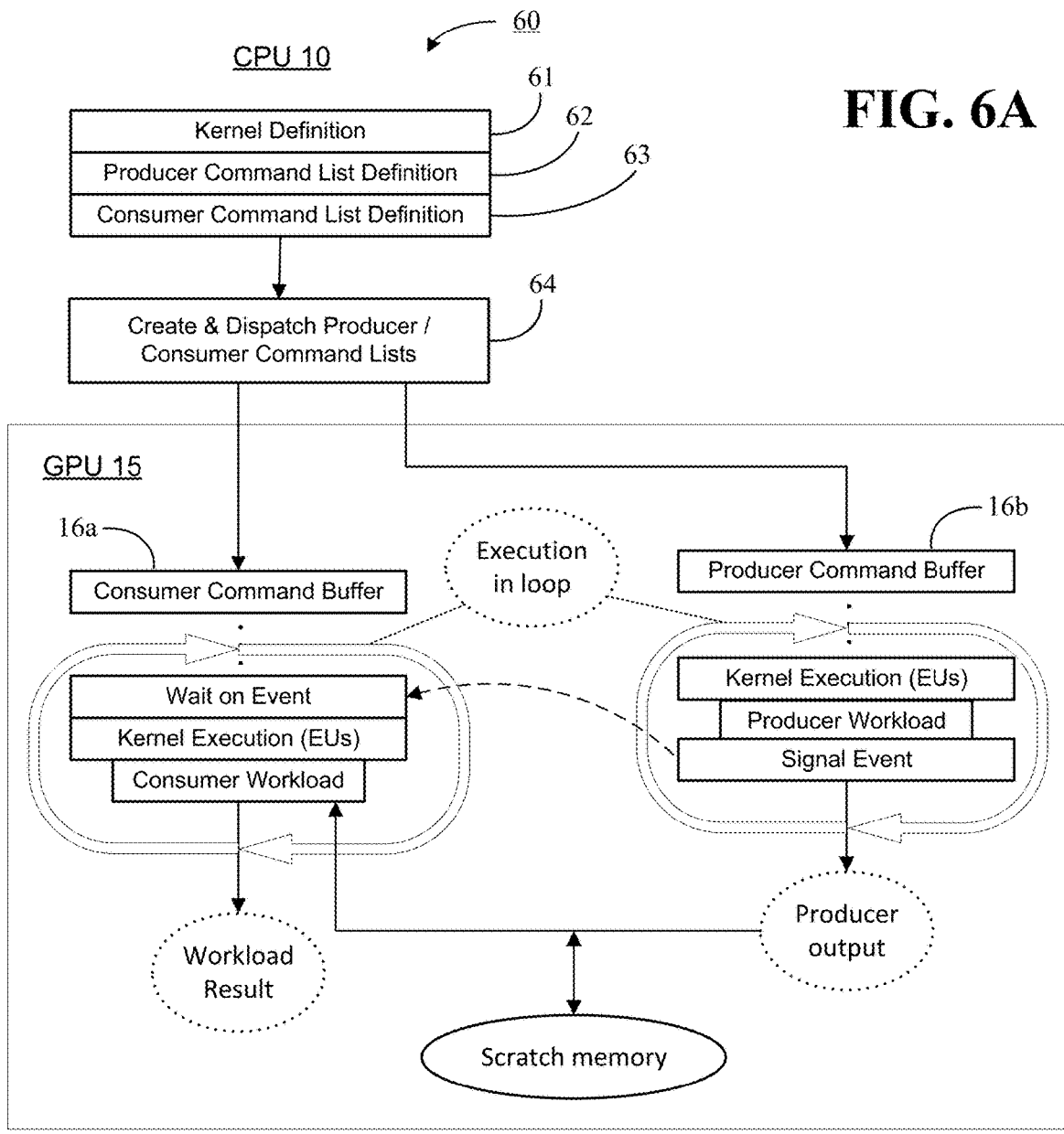

FIGS. 6A-6E provide diagrams illustrating an example of producer-consumer command lists according to one or more embodiments, with reference to components and features described herein including but not limited to the figures and associated description. Turning to FIG. 6A, shown is an example control flow 60 for producer-consumer command list generation and simultaneous execution on two GPU engines (via two command streamers). Label 61 of the illustrated example references the code definition for the kernel to be executed, which in the example includes two functions, an addition function (named Add2) and a multiplication function (named Mult2) (similar to the example functions of FIGS. 5A-5E). Label 62 of the illustrated example references the code definition for the producer command list, and label 63 references the code definition for the consumer command list. In the example these codes can be compiled to generate and dispatch command lists to two GPU command buffers 16 for simultaneous execution by two GPU command streamers 25. At label 64, the kernel code definition and the producer/consumer command list definitions are compiled by the compiler 21 to generate a consumer command list, which is dispatched by the CPU 10 to a consumer command buffer 16a, and a producer command list, which is dispatched by the CPU 10 to a producer command buffer 16b. The GPU 15, via the capabilities of command streamers 25 (not shown in FIG. 6A), causes the hardware instructions in the consumer command list, which have been loaded into the consumer command buffer 16a, to be executed as a consumer workload on a first set of EUs, and also causes the hardware instructions in the producer command list, which have been loaded into the producer command buffer 16b, to be executed as a producer workload on a second set of EUs. The consumer and producer workloads in the example can be executed simultaneously, with implicit synchronization.

In the example of FIG. 6A, the producer command list causes (via a first command streamer 25, not shown) execution of the producer workload within a loop, which generates results stored in a scratch memory and then signals via a signal event to the consumer workload that the producer workload is completed. The producer workload includes execution of a first one of the defined kernels (e.g., the Add(2) or the Mult2( ) kernel). The consumer command list causes (via a second command streamer 25, not shown) execution of the consumer workload within a loop, which includes a wait command to wait for a signal event from the producer workload. Upon receiving the signal event, the execution of the consumer workload causes the GPU to read the producer results scratch memory, execute a second of the defined kernels (e.g., the Mult2( ) or the Add(2) kernel), and generate results that are collected in memory.

Example pseudo code for the producer-consumer command list example of FIG. 6A is shown in FIGS. 6B-6E, which are further illustrative of the new C-like programming language and types. FIG. 6B illustrates example pseudo code 61A for the kernel definition (referenced at label 61 in FIG. 6A, already discussed). Similar to the pseudo code 51A (FIG. 5B, already discussed), the pseudo code 61A defines two kernel functions, Add2( ) and Mult2( ). The kernel Add2( ) operates on a one-dimension (1D) range and performs addition (in parallel) of the number 2 to the value stored in src buffer, and assigns the result in dst buffer. The kernel Mult2( ) operates on a 1D range and performs multiplication (in parallel) of the number 2 with the value stored in src buffer and assigns the result in dst buffer. The identifier gid is the unique identifier of each work-item, and block is an argument for the kernel and indicates which block of the src/dst allocation must be processed. The block_size is a constant value and defines the size of the block. The multiply and add functions in the kernel definition code 61A can be compiled to provide the hardware instructions that implement mathematic instructions for multiplication and addition.

FIG. 6C illustrates example pseudo code 62A for the producer command list definition (referenced at label 62 in FIG. 6A, already discussed), and FIG. 6D illustrates example pseudo code 63A for the consumer command list definition (referenced at label 63 in FIG. 6A, already discussed). These command lists reside in single source file, and provide execution of workloads that are implicitly synchronized by semaphores (e.g., signals). For example, semaphore wait and semaphore signal can be achieved by hardware commands MI_SEMAPHORE_WAIT and MI_SEMAPHORE_SIGNAL or MI_STORE_DATA_IMM (which stores value in memory). The producer workload performs computations and once the kernel is finished, then it signals the consumer to perform the consumer workload on a selected data chunk (e.g., the scratch memory). Then it waits for the consumer to signal it has finished the processing. At the end, the producer signal via global variable "stop" the workload is done. The consumer workload waits for the signal from the producer and gets the next chunk of data until the "stop" signal is set by the producer. The code defining the producer takes an engine (which is a software abstract object of a command streamer) and kernel (e.g., referencing the Add2 kernel or the Mult2 kernel) as arguments. The code then executes the kernel, but each execution has a different "block" argument, represented as "i"—as an index for each iteration of the loop. After the kernel is dispatched, the command list adds a barrier command in order to wait for the kernel to finish and then to signal an event (signal_consumer) to the consumer workload. The command list adds a wait on event command, that will wait for the consumer workload to iterate the loop. After the loop is finished, the producer workload will perform a cache flush and signal the consumer to stop (implicit global allocation). The consumer command list code (FIG. 6D) defines an endless loop that can be stopped only via setting the stop value (i.e., by the producer) to "1."

The producer command list definition code in FIG. 6C includes several additional new data structures and built-in functions, such as the following:

"event_t"—(similar to OpenCL) implicit storage for event data, this is a software abstract representation for internal allocation that keeps the role of the event;

"signal_event( )"—this is a built-in function that can be implemented using different hardware commands, depending on the selected engine—such as, e.g., the hardware command MI_SEMAPHORE_SIGNAL or the hardware command MI_STORE_DATA_IMM;

"wait_event"—is a built-in function that implements a wait for a value stored in an event, can correspond to a hardware command such as, e.g., the hardware command MI_SEMAPHORE_WAIT.

FIG. 6E illustrates example pseudo code 64A for creating and dispatching the producer and consumer command lists (referenced at label 64 in FIG. 6A, already discussed). As shown in FIG. 6E, both producer and consumer command queues are asynchronous, so execution is non-blocking. Both engines and kernels are assigned as regular symbols, using the variable "deviceFlow", which is the abstract representation of the source code at FIG. 6C and FIG. 6D. Since these are implicit command lists, engines for each command list are assigned via an existing command queue (which is a software abstract representation for command streamer/engine), where the name of each flow is the same as the internal command list representation. In the example of FIG. 6E, when compiled by compiler 21, calls to trinity_set_symbol_value( ) assign the name "producer" to the &cmdQueueProducer and the name "consumer" to &cmdQueueConsumer. In addition, the calls to trinity_set_symbol_value( ) (labeled as 64B in FIG. 6E) assign the "consumer_kernel" argument for the "consumer" command list which sets the flow for the consumer command list to execute the multiply kernel (Mult2), and assign the "producer_kernel" argument for the producer command list which sets the flow for the producer command list to execute the add kernel (Add2).

Figure 7A:
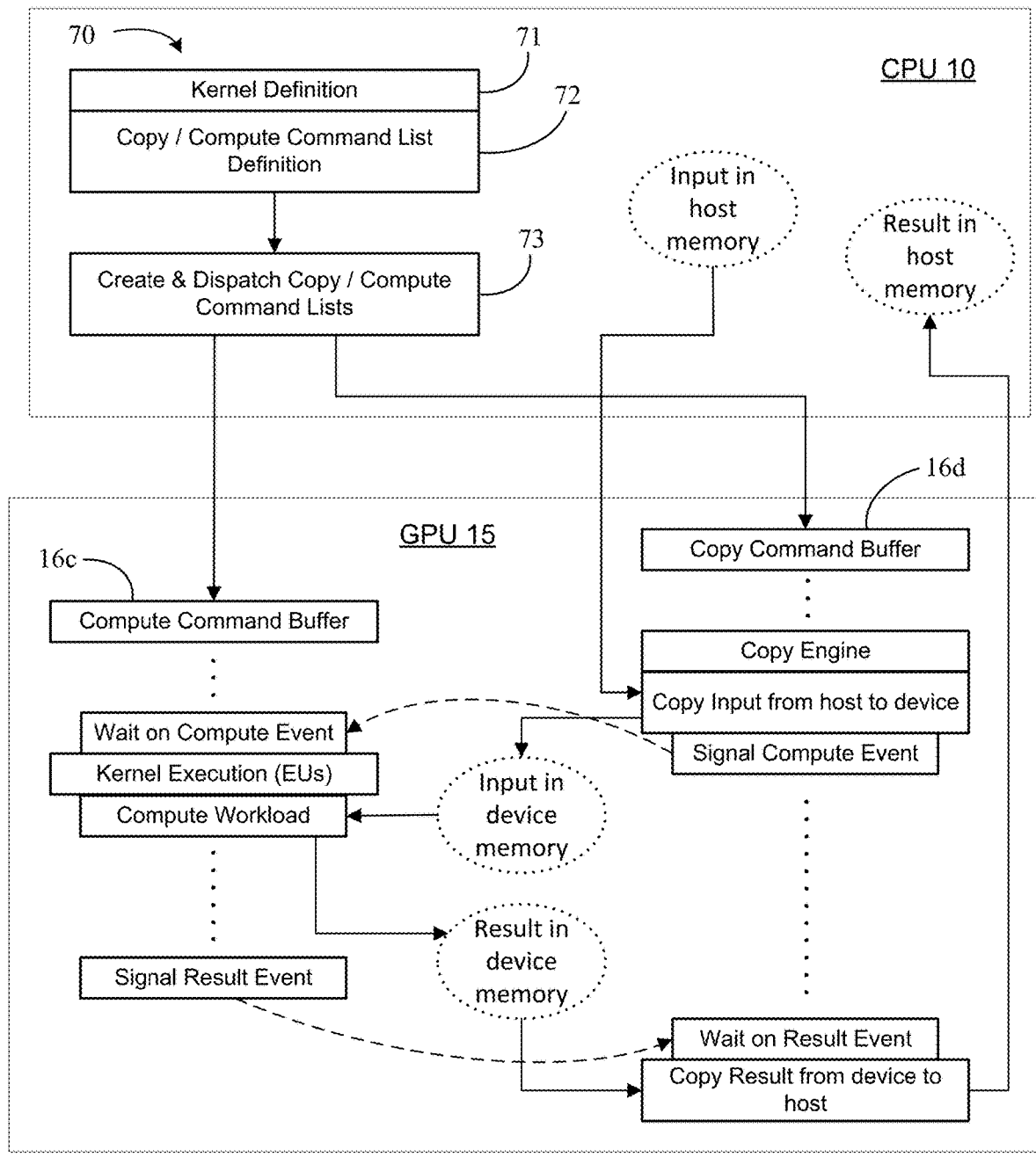

FIGS. 7A-7D provide diagrams illustrating an example of single flow command lists for multiple engines according to one or more embodiments, with reference to components and features described herein including but not limited to the figures and associated description. Turning to FIG. 7A, shown is an example control flow 70 for single flow command list generation and execution on two GPU engines (via two command streamers). This example shows the generation and use of explicit command lists within a single flow; explicit command lists are used when multiple engines—in this example, a copy engine and a compute engine—are used within a single flow.

Label 71 of the illustrated example references the code definition for the kernel to be executed, which in the example includes a function (factorial) to compute the factorial of a number. Label 72 of the illustrated example references the code definition for the copy/compute command lists. In the example the code can be compiled to generate and dispatch command lists to two GPU command buffers 16 for simultaneous execution by two GPU command streamers 25. At label 73, the kernel code definition and the copy/compute command list definition are compiled by the compiler 21 to generate a compute command list, which is dispatched by the CPU 10 to a compute command buffer 16c, and a copy command list, which is dispatched by the CPU 10 to a copy command buffer 16d. The GPU 15, via the capabilities of command streamers 25 (not shown in FIG. 7A), causes the hardware instructions in the copy command list, which have been loaded into the copy command buffer 16d, to be executed as a copy workload on a copy engine, and also causes the hardware instructions in the compute command list, which have been loaded into the compute command buffer 16c, to be executed as a compute workload on a set of EUs (e.g., compute engine). The copy and compute workloads in the example can be executed simultaneously, with explicit synchronization via globally-defined events.

As illustrated in FIG. 7A, the copy engine (via a command streamer 25, not shown in FIG. 7A) executes the copy command list that has been loaded into the copy command buffer, which causes the following activity by the copy engine. The copy engine reads input data from the host memory and copies the data into device memory in the GPU. When the input data is copied, the copy engine issues (signals) a compute event to the compute engine, which indicates that the data is ready for processing by the compute workload. The copy engine then enters a wait state (via a wait command), that waits for the compute engine to complete the compute workload. When the copy engine receives a result event from the compute engine, the copy engine then copies the results from the device memory to the host memory.

As further illustrated in FIG. 7A, the compute engine (via a command streamer 25, not shown in FIG. 7A) executes the compute command list that has been loaded into the compute command buffer, which causes the following activity by the compute engine. The compute engine waits for a compute event signal from the copy engine that indicates the data has been copied and is ready for the compute workload. The compute engine then executes the compute workload (which includes the factorial kernel) on the data in the device memory and stores the results in device memory. When the compute workload is complete, the compute engine issues (signals) a result event to the copy engine, to indicate the workload is complete and that the results data is ready to be copied to the host memory.

Example pseudo code for the single flow command list example of FIG. 7A is shown in FIGS. 7B-7D, which are further illustrative of the new C-like programming language and types. FIG. 7B illustrates example pseudo code 71A for the kernel definition (referenced at label 71 in FIG. 7A, already discussed), which is a factorial function that computes the factorial of an input number.

FIG. 7C illustrates example pseudo code 72A for the single flow command list definition (referenced at label 72 in FIG. 7A, already discussed). This example shows creation of multiple command lists within a single source file of the new C-like code. Each command list is distinguished by the use of a separate engine (in this example, a copy engine and a compute engine). This example also shows explicit synchronization between command lists by using globally defined events. The command list definition code in FIG. 7C includes several additional new data structures and built-in functions, such as the following:

"engine_t" is a built-in type and abstract software object for the particular command streamer (based on engine type);

"global_event_t"—an event that can be explicitly assigned as a symbol;

"dispatch_fill( )," "dispatch_copy( )"—these are fixed functions that are converted into (a) copy command streamer (also known as a blitter command streamer) commands when the "copy" engine symbol is assigned to the copy command queue, or (b) built-in copy kernels, their indirect heaps and COMPUTE_WALKER commands when the "copy" engine symbol is assigned to the compute command queue.

In the example pseudo code 72A of FIG. 7C, the command flow is explicit and each command streamer/engine built-in function has an associated engine parameter. Engine arguments are added to command flow and passed to the built-in functions. For example, the dispatch_fill( ), and dispatch_copy( ) functions have the copy engine passed as a first argument. The first call to dispatch_copy( ) has a signal_compute event passed as an argument, which means this is an output event and the event will be used to signal when dispatch_copy( ) has been finished. The kernel_start( ) and signal_event( ) functions have the compute engine passed as an argument. Calls to wait_event( ) are used by both engines and indicate the order of wait operations in relation to other commands in both explicit engine command lists embedded in the example command flow.

FIG. 7D illustrates example pseudo code 73A for creating and dispatching the copy and compute command lists (referenced at label 73 in FIG. 7A, already discussed). The example demonstrates retrieval of separate command lists—explicit compute and copy command lists for a compute engine and a copy engine, as they are defined and used in the same source file (e.g., "name_of_the_flow #name_of_engine_symbol", which here is "copy_and_compute #compute"). As shown in FIG. 7D, this example uses different families of command queues (e.g., ordinal=0 is compute, and ordinal=1 is copy). Also illustrated is explicit assignment of events between the copy and compute engines (since these events are device-side only, then they are allocated from non-host event pool). In the example of FIG. 7D, when compiled by compiler 21, the call to trinity_set_symbol_value( ) (labeled as 73B in FIG. 7D) associates the argument "compute_kernel" with the "factorial" kernel, which sets the flow for the compute command list to execute the factorial kernel (example code 71A in FIG. 7B, already discussed).

FIGS. 8A-8D provide flow charts illustrating example methods 80, 83, 86, and 90 of programming a GPU command buffer according to one or more embodiments, with reference to components and features described herein including but not limited to the figures and associated description. Each of the methods 80, 83, 86, and/or 90 can generally be implemented in the computing system 1500 (FIG. 1B, already discussed). More particularly, each of the methods 80, 83, 86, and/or 90 can be implemented as one or more modules in a set of program or logic instructions stored in a non-transitory machine- or computer-readable storage medium such as such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out operations shown in the methods 80, 83, 86, and/or 90 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning to the method 80 in FIG. 8A, illustrated processing block 81 provides for compiling a source file to generate a command list, where the command list comprises a set of hardware-specific executable commands for a GPU. Illustrated processing block 82 provides for dispatching the command list to a command buffer for execution by the GPU. In some embodiments, the source file can include function calls specific to GPU hardware blocks, and the command list can include executable commands directed to the GPU hardware blocks based on the function calls. In some embodiments, the command list can include one or more of an executable loop command, an executable conditional branch command, or an executable jump command. In some embodiments, the command list is reconfigurable at runtime. In some embodiments, the command list can include a first command list for dispatch to a first command buffer for execution by the GPU and a second command list for dispatch to a second command buffer for execution by the GPU, and wherein the first command list includes an instruction to wait for execution until a coordinating event is produced by the second command list. In some embodiments, the extension of driver stack 24 can be used in performing certain operations as part of illustrated processing block 82—such as, for example, creating specific allocations, patching memory with actual values (e.g., GPU virtual addresses), and ensuring the GPU is ready to process the command list.

Turning now to the method 83 in FIG. 8B, illustrated processing block 84 provides for dispatching the command list via an API call to a graphics driver. At illustrated processing block 85, the API bypasses generating GPU commands for the command list, and the graphics driver bypasses encoding the hardware-specific executable commands in the command list. In embodiments, the method 83 can generally be substituted for at least a portion of illustrated processing block 82 (FIG. 8A, already discussed).

Turning now to the method 86 in FIG. 8C, illustrated processing block 87 provides for storing the command list. Illustrated processing block 88 provides for retrieving the command list from storage prior to dispatching the command list to the command buffer. In embodiments, the method 86 can generally be implemented between the activity of illustrated processing block 81 and the activity of illustrated processing block 82 (FIG. 8A, already discussed).

Figure 8D:
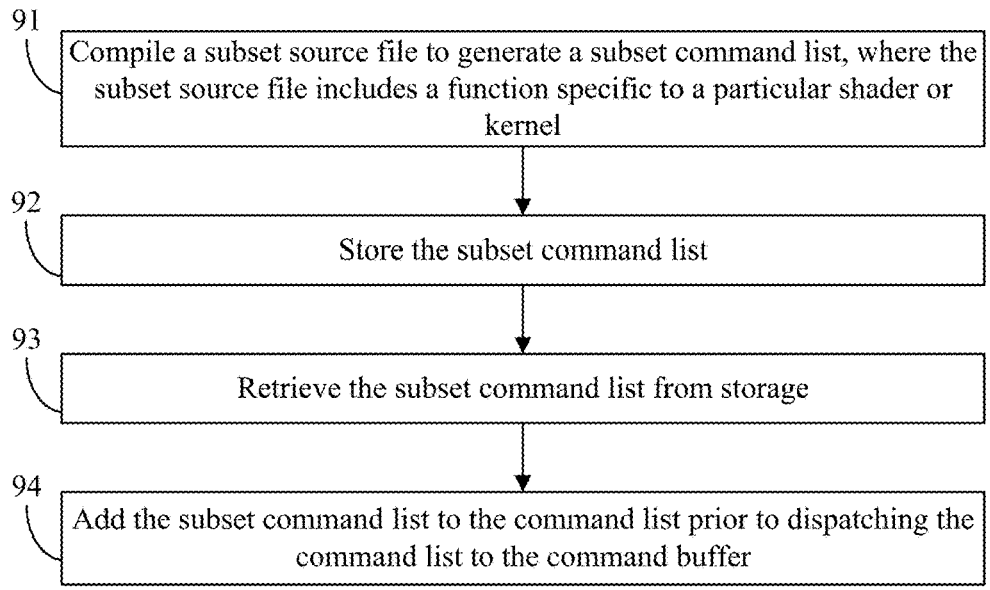

Turning now to the method 90 in FIG. 8D, illustrated processing block 91 provides for compiling a subset source file to generate a subset command list, where the subset source file includes a function specific to a particular shader or kernel. Illustrated processing block 92 provides for storing the subset command list. Illustrated processing block 93 provides for retrieving the subset command list from storage. Illustrated processing block 94 provides for adding the subset command list to the command list prior to dispatching the command list to the command buffer. In embodiments, the method 90 can generally be implemented before the activity of illustrated processing block 82 (FIG. 8A, already discussed).

Figure 9:
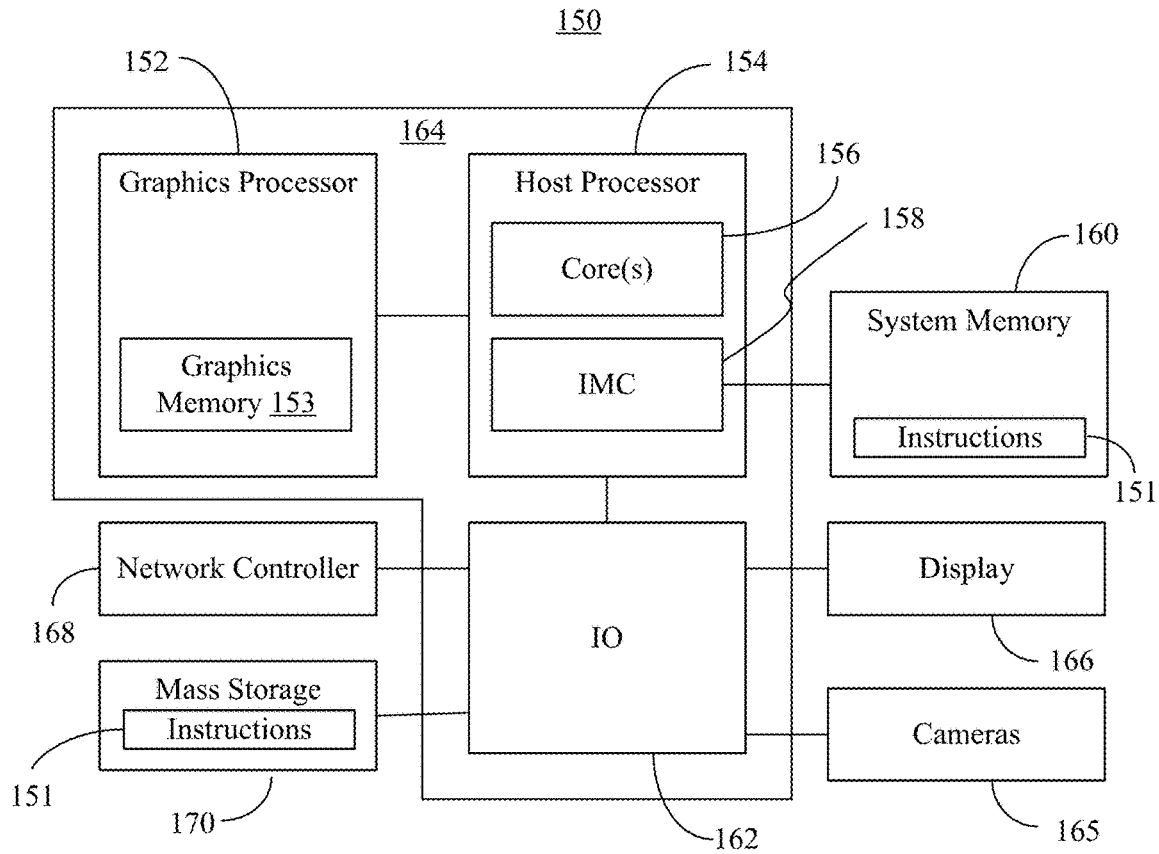
FIG. 9 is a block diagram of an example of a performance-enhanced computing system according to an embodiment.

FIG. 9 shows a performance-enhanced computing system 150 that may generally be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a graphics processor 152 (e.g., graphics processing unit/GPU) and a host processor 154 (e.g., central processing unit/CPU) having one or more cores 156 and an integrated memory controller (IMC) 158 that is coupled to a system memory 160.

Additionally, the illustrated system 150 includes an input output (IO) module 162 implemented together with the host processor 154, and the graphics processor 152 on a system on chip (SoC) 164 (e.g., semiconductor die). In one example, the IO module 162 communicates with a plurality of cameras 165, a display 166 (e.g., including a touch screen, liquid crystal display/LCD and/or light emitting diode/LED display panel), a network controller 168 (e.g., wired and/or wireless), and mass storage 170 (e.g., hard disk drive/HDD, optical disk, solid state drive/SSD, flash memory). In one or more embodiments, the system memory 160 and/or the mass storage 170 include instructions 151 to perform one or more aspects of the method 80 (FIG. 8A), the method 83 (FIG. 8B), the method 86 (FIG. 8C), and/or the method 90 (FIG. 8D), already discussed. In one or more embodiments, the system 150 implements some or all aspects of the system 1500 (FIG. 1B, already discussed).

The SoC 164 may include one or more substrates (e.g., silicon, sapphire, gallium arsenide), wherein the logic 174 is a transistor array and/or other integrated circuit/IC components coupled to the substrate(s). In one example, the logic 174 includes transistor channel regions that are positioned (e.g., embedded) within the substrate(s). Thus, the physical interface between the logic 174 and the substrate(s) may not be an abrupt junction. The logic 174 may also be considered to include an epitaxial layer that is grown on an initial wafer of the substrate(s).

System Overview

Figure 10:
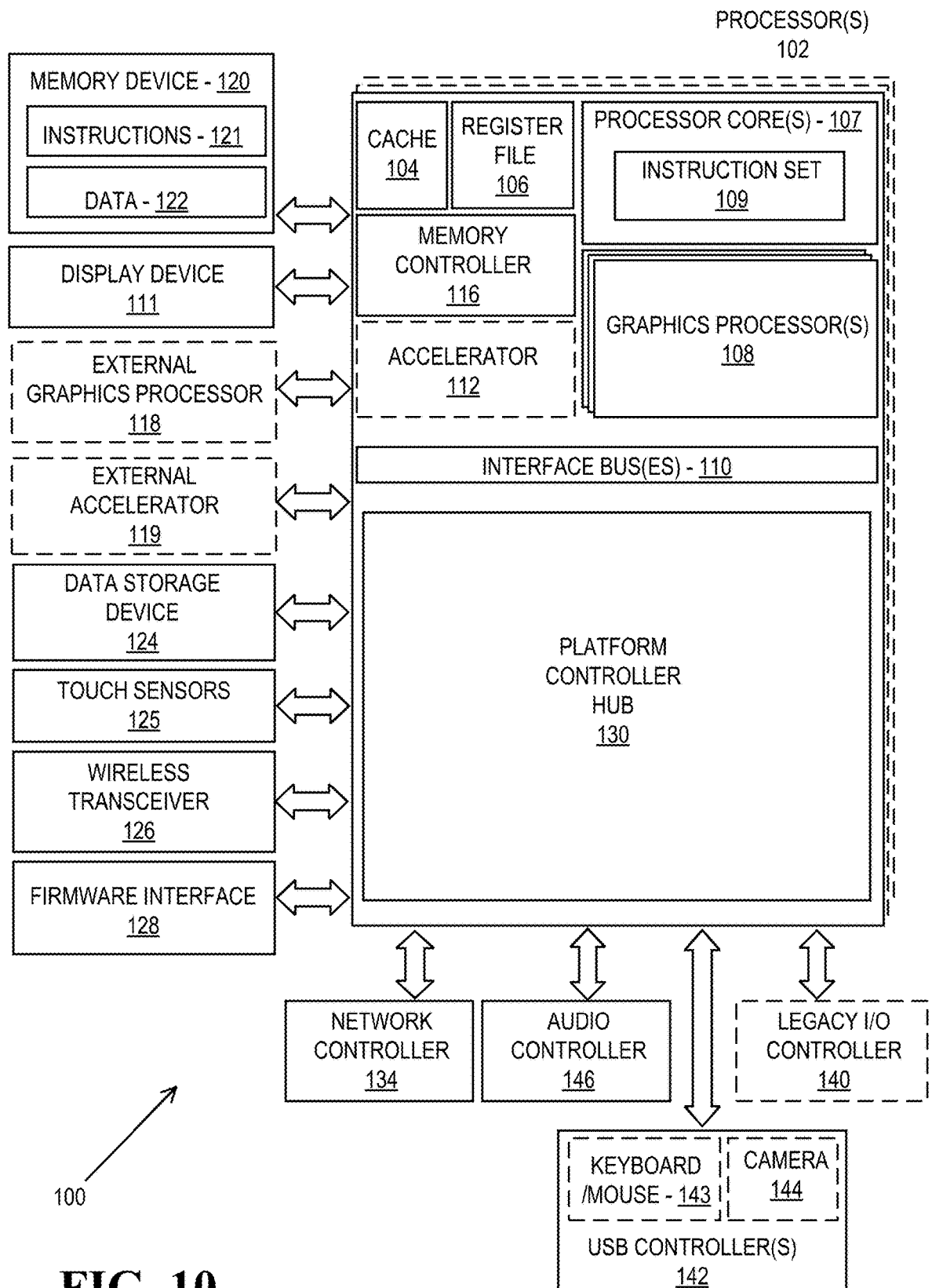
FIG. 10 is a block diagram of an example of a processing system according to an embodiment.

FIG. 10 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 11A-11D illustrate computing systems and graphics processors provided by embodiments described herein. The elements of FIGS. 11A-11D having the same reference numbers (or names) as the elements of any other figure herein can operate or function in any manner similar to that described elsewhere herein, but are not limited to such.

Figure 11A:
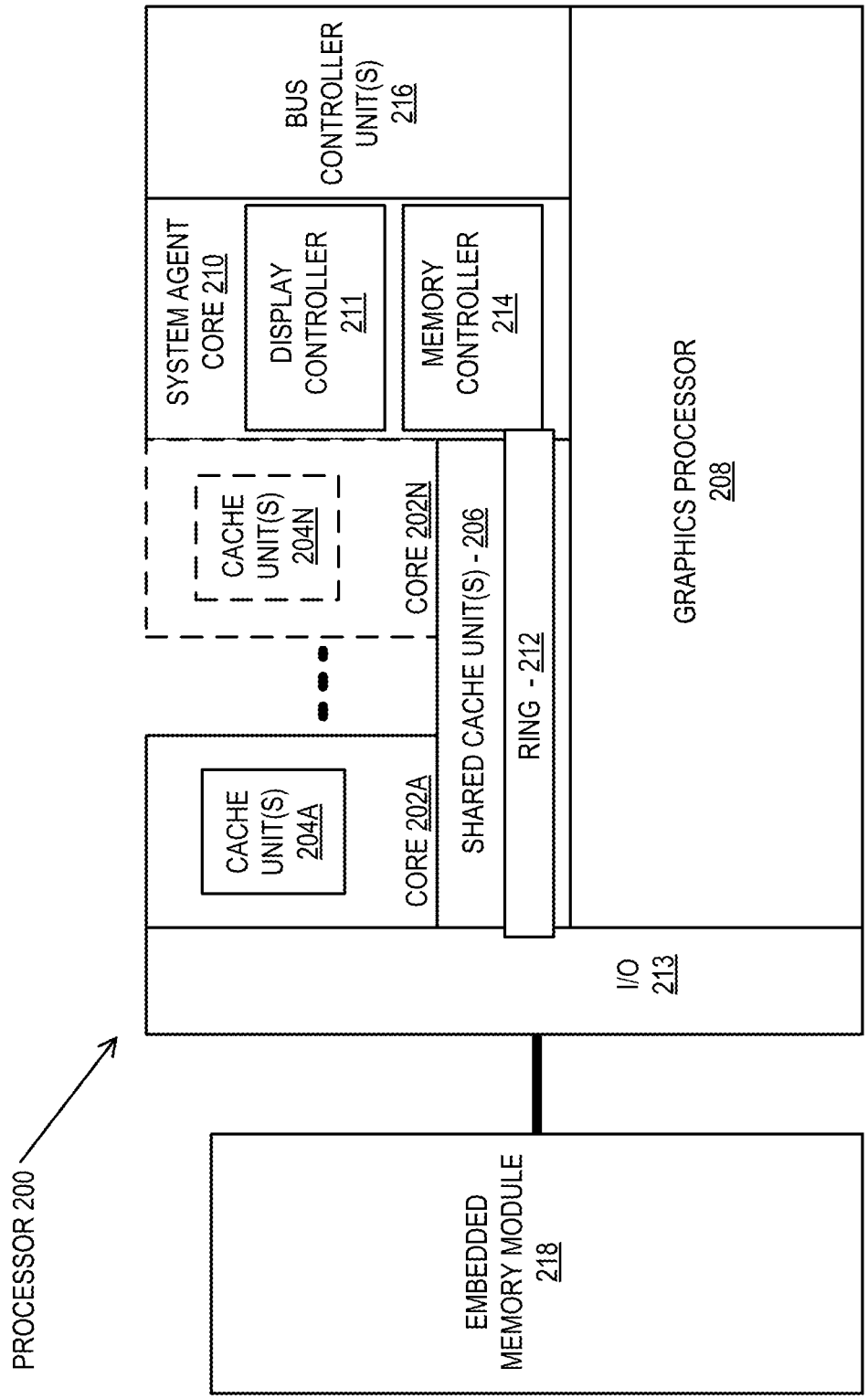
FIGS. 11A-11D are block diagrams of examples of computing systems and graphics processors according to embodiments.

FIG. 11A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring-based interconnect unit 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 11B:
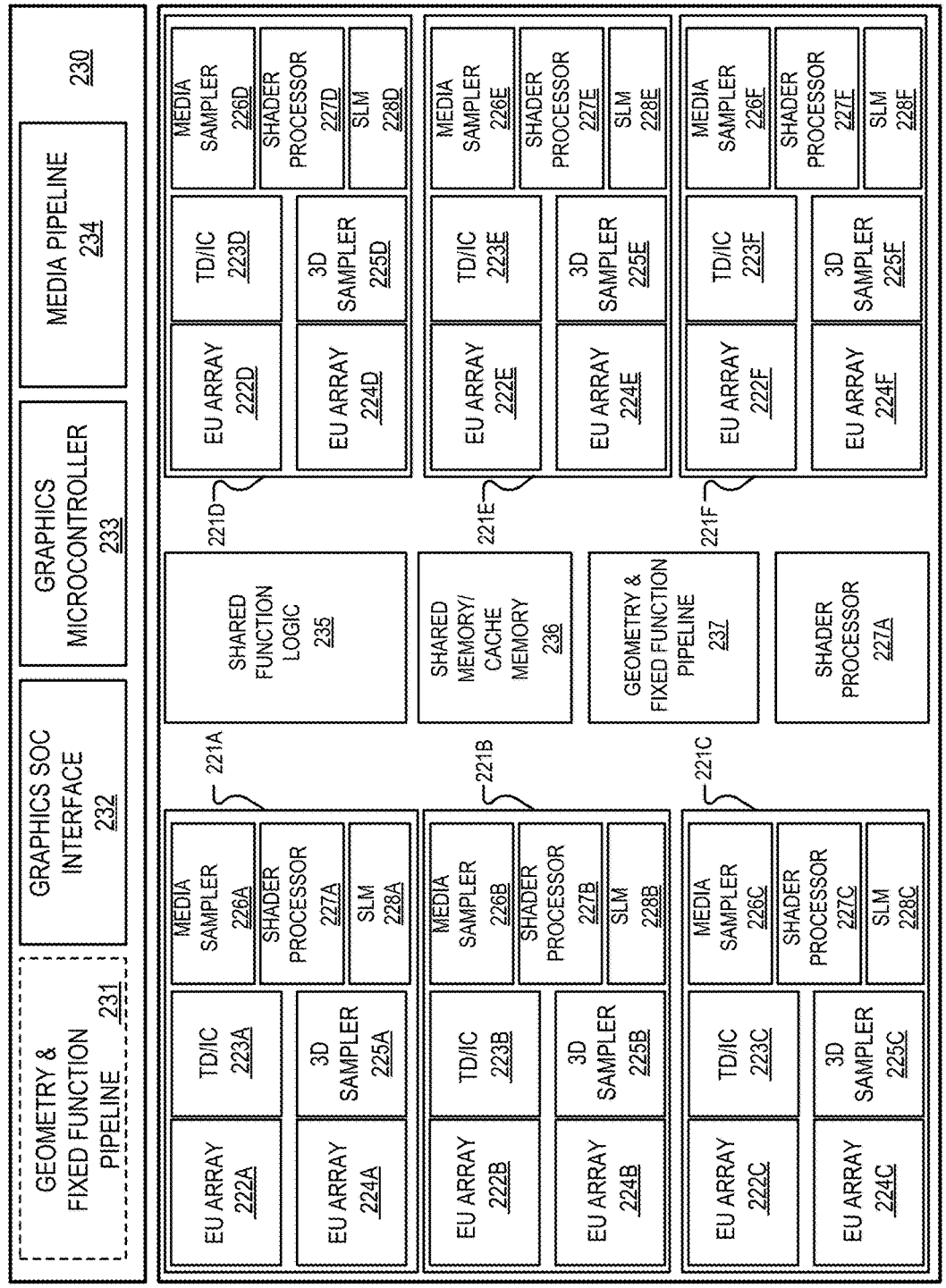

FIG. 11B is a block diagram of hardware logic of a graphics processor core 219, according to some embodiments described herein. Elements of FIG. 11B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3 and FIG. 13, described below) a video front-end unit, a thread spawner and thread dispatcher, and a unified return buffer manager, which manages unified return buffers (e.g., unified return buffer 418 in FIG. 13, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and pre-emption. The media pipeline 234 (e.g., media pipeline 316 of FIG. 3 and FIG. 13) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphics processor core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 13 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 226A-226F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 226A-226F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 11C:
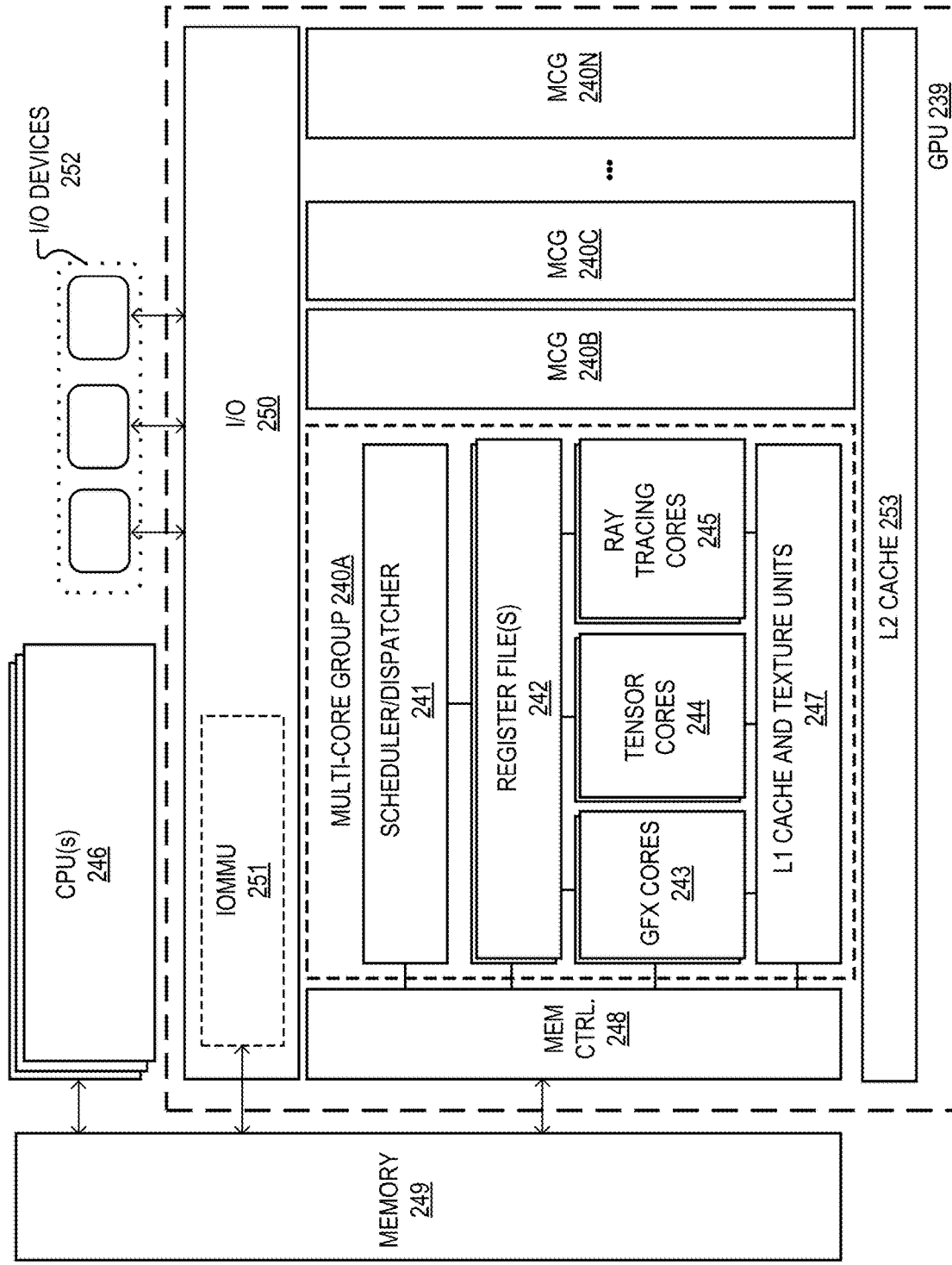

FIG. 11C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and texture units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOM MU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 11C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 11D:
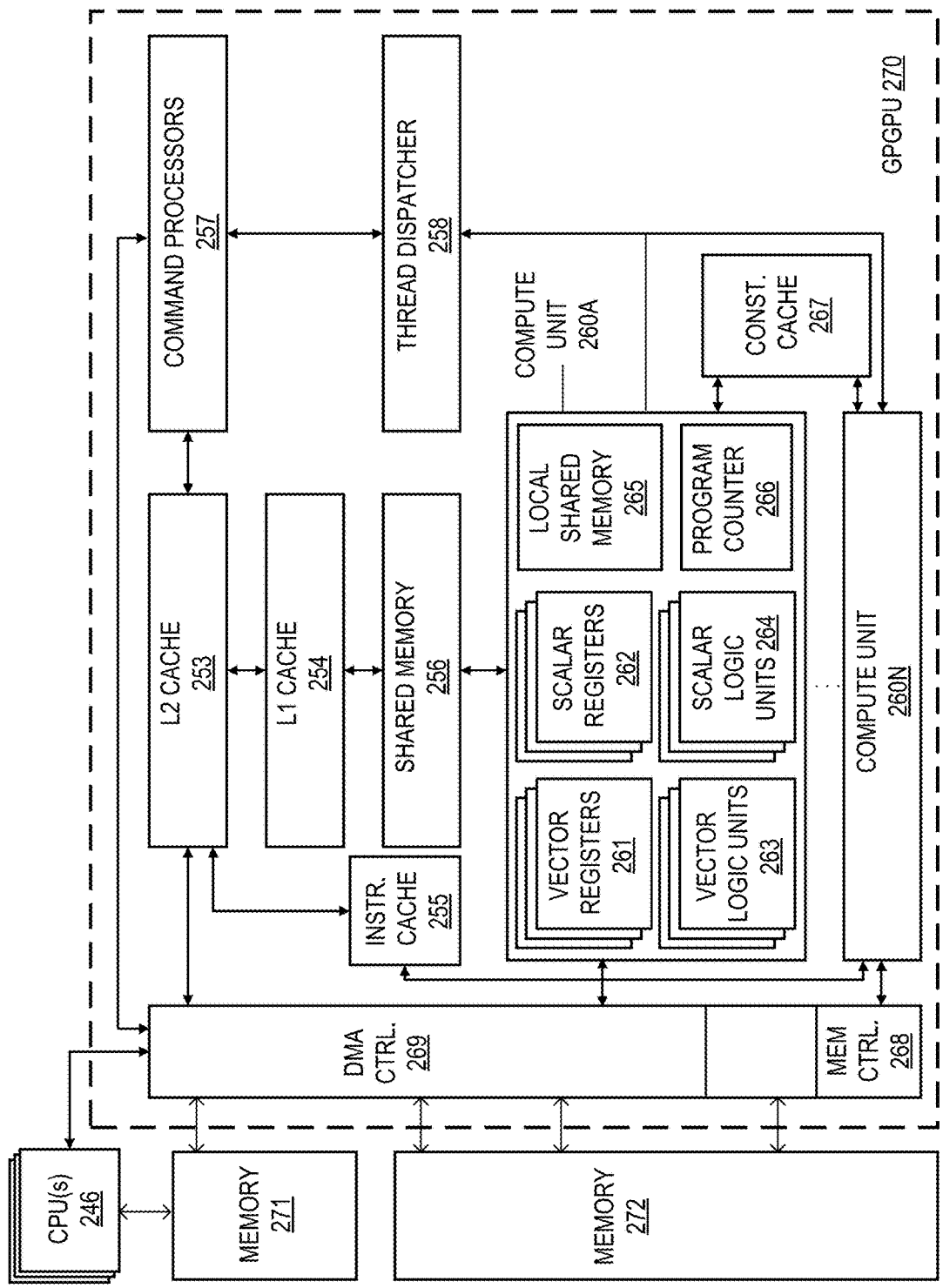

FIG. 11D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally each compute unit 260A-260N can be independently configured for conditional computation and can conditionally output the results of computation to memory. The command processors 257 can interrupt the one or more CPU(s) 246 when the submitted commands are complete.

Figure 12A:
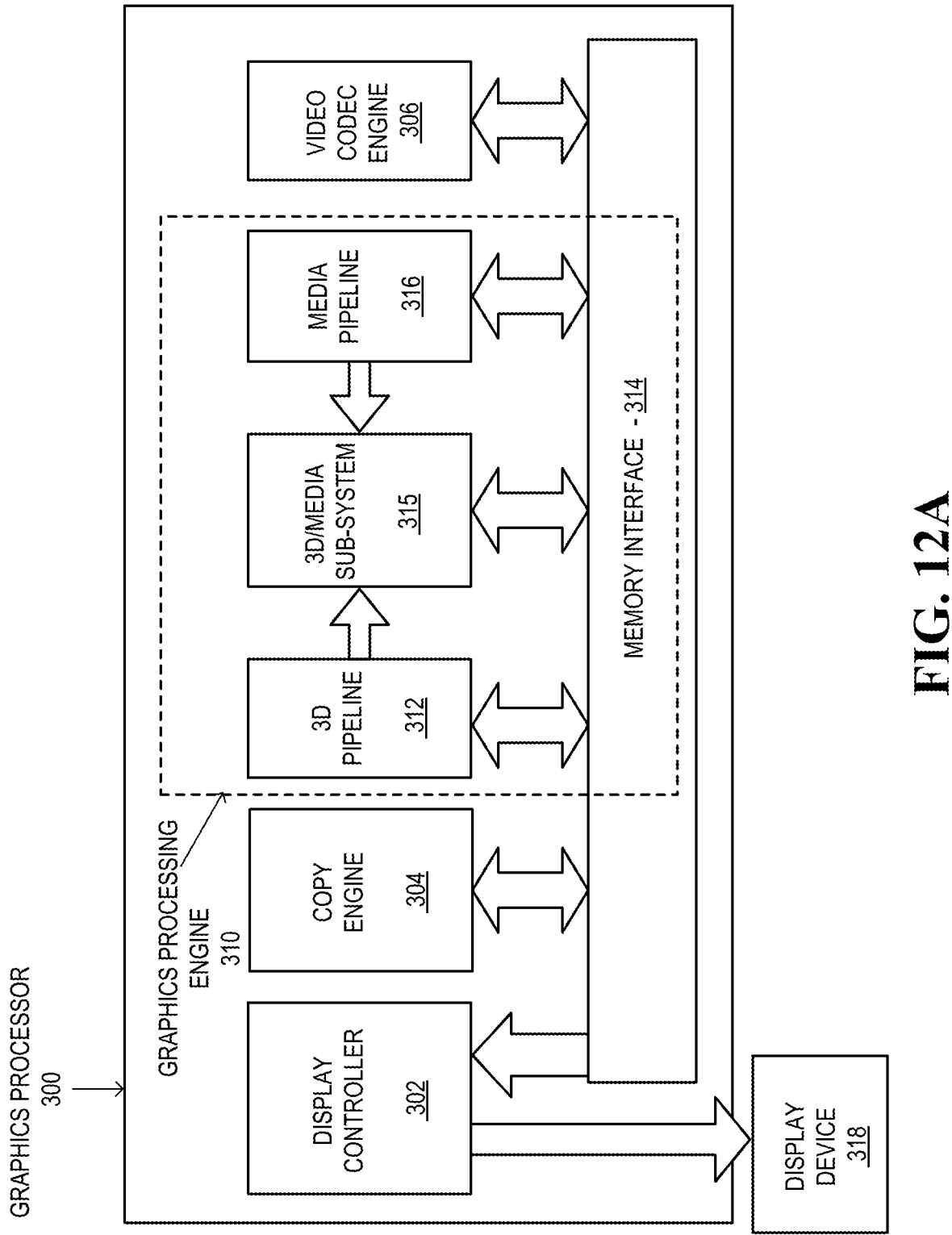
FIGS. 12A-12C are block diagrams of examples of additional graphics processor and compute accelerator architectures according to embodiments.
Figure 12B:
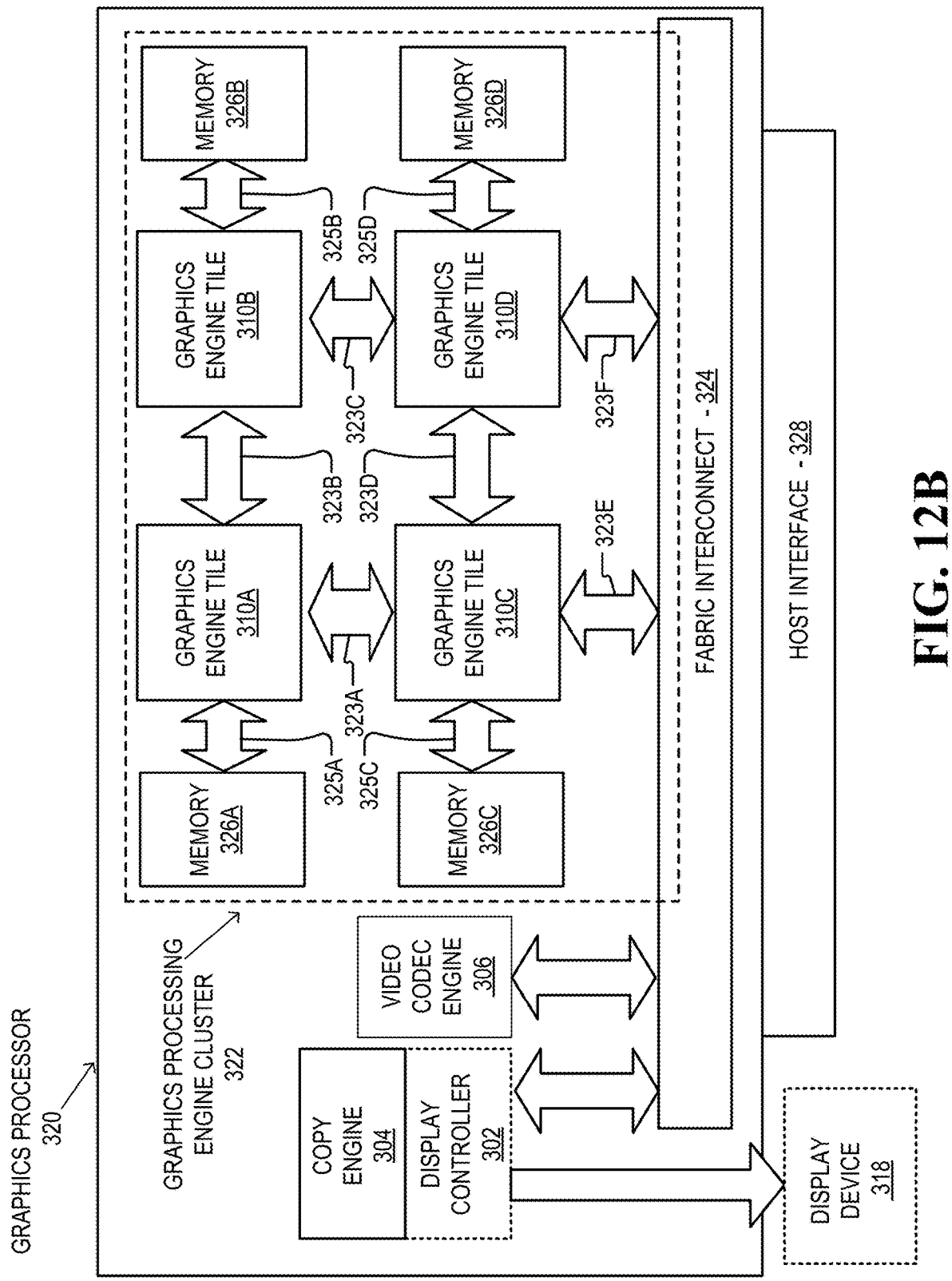

FIGS. 12A-12B illustrate block diagrams of additional graphics processor and compute accelerator architectures provided by embodiments described herein. The elements of FIGS. 12A-12B having the same reference numbers (or names) as the elements of any other figure herein can operate or function in any manner similar to that described elsewhere herein, but are not limited to such.

FIG. 12A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/ MPEG-4 AVC, H.265/ HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 12B illustrates a graphics processor 320 having a tiled architecture, according to embodiments described herein. In one embodiment the graphics processor 320 includes a graphics processing engine cluster 322 having multiple instances of the graphics processing engine 310 of FIG. 12A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 20B-20D.

The graphics processing engine cluster 322 can connect with an on-chip or on-package fabric interconnect 324. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D.

The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

Figure 12C:
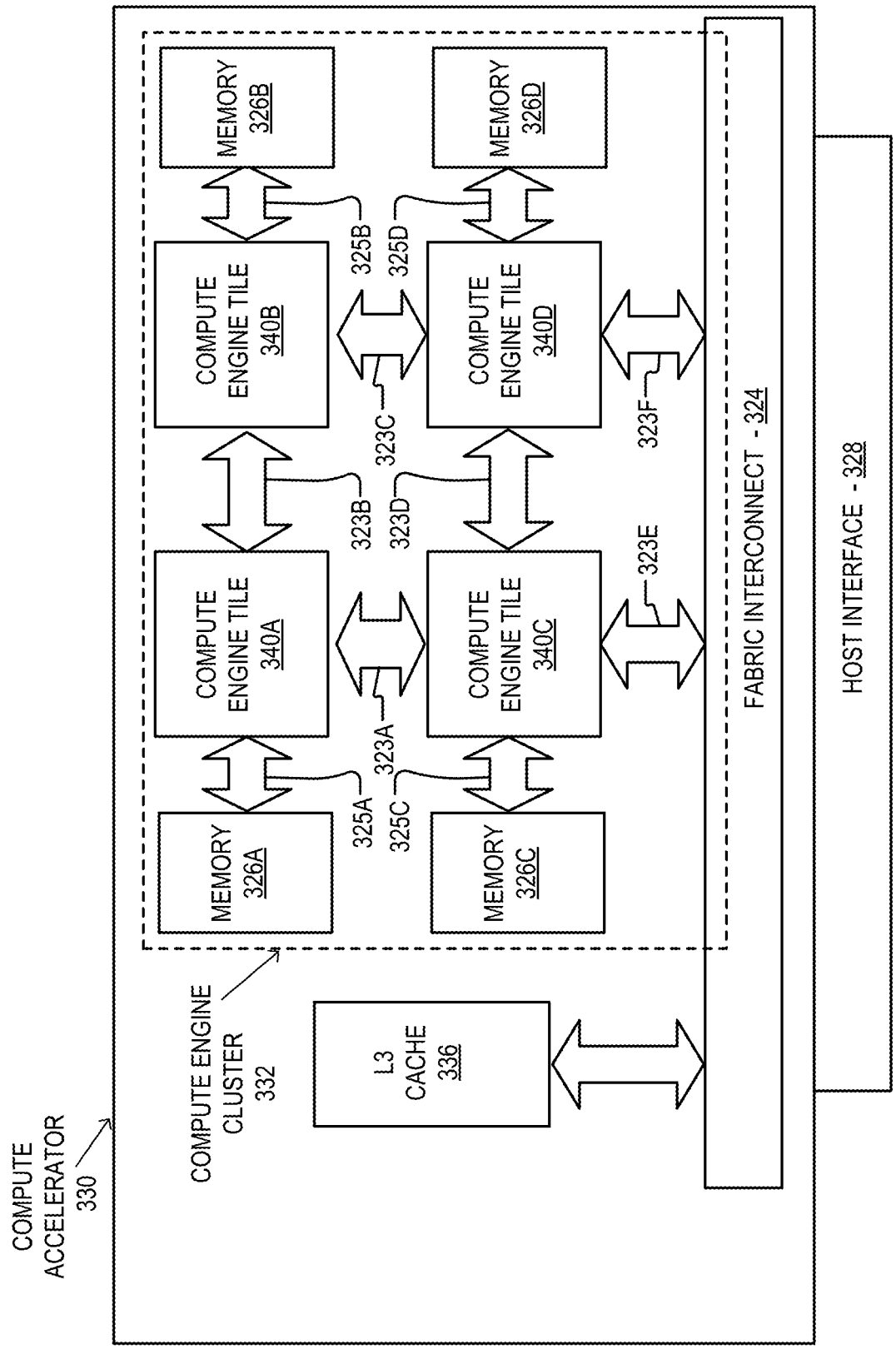

FIG. 12C illustrates a compute accelerator 330, according to embodiments described herein. The compute accelerator 330 can include architectural similarities with the graphics processor 320 of FIG. 12B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 12B.

Graphics Processing Engine

Figure 13:
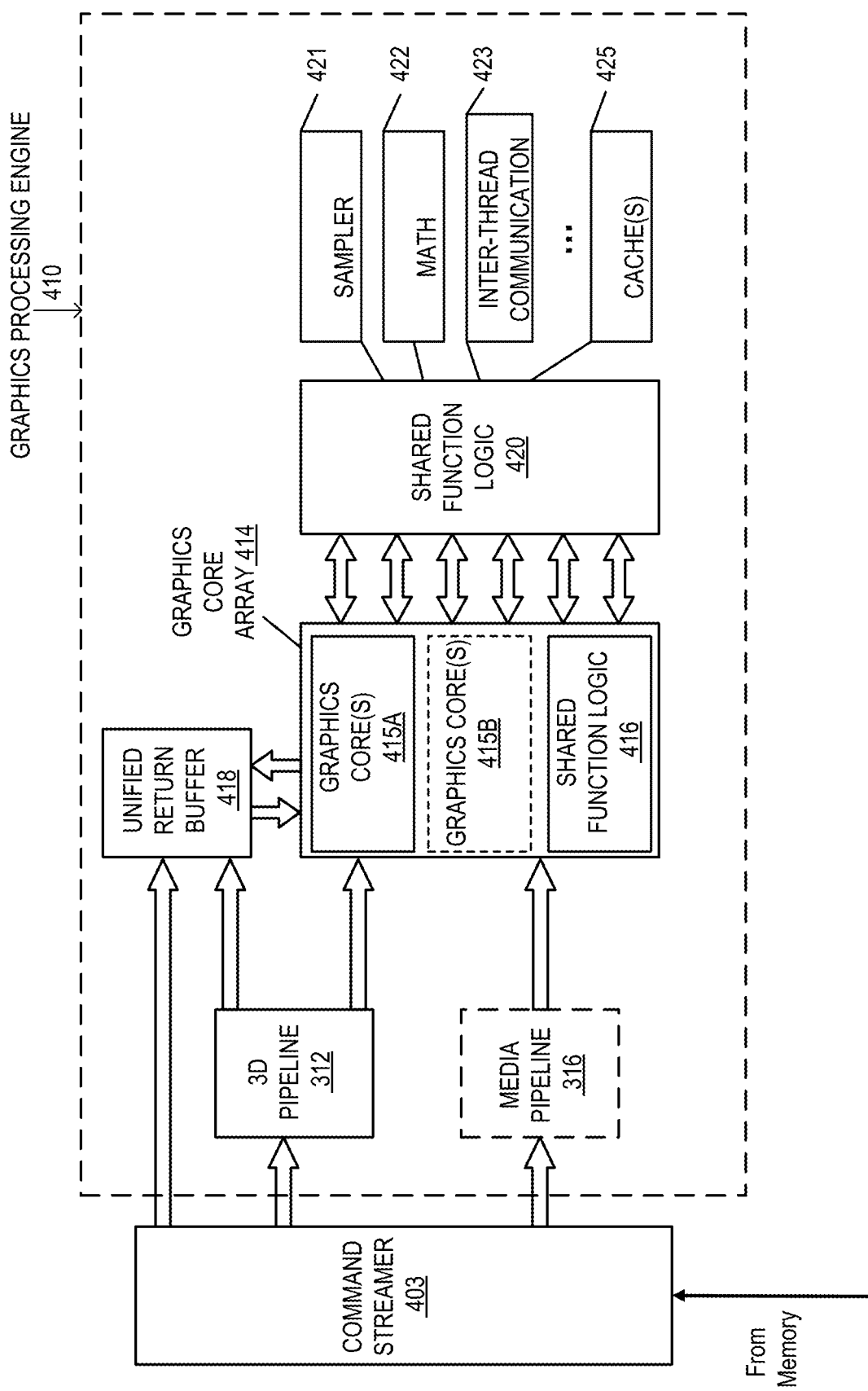
FIG. 13 is a block diagram of an example of a graphics processing engine of a graphics processor according to an embodiment.

FIG. 13 is a block diagram of a graphics processing engine 410 of a graphics processor in accordance with some embodiments. In one embodiment, the graphics processing engine (GPE) 410 is a version of the GPE 310 shown in FIG. 12A, and may also represent a graphics engine tile 310A-310D of FIG. 12B. Elements of FIG. 13 having the same reference numbers (or names) as the elements of any other figure herein can operate or function in any manner similar to that described elsewhere herein, but are not limited to such. For example, the 3D pipeline 312 and media pipeline 316 of FIG. 12A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 10 or core 202A-202N as in FIG. 11A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 14A:
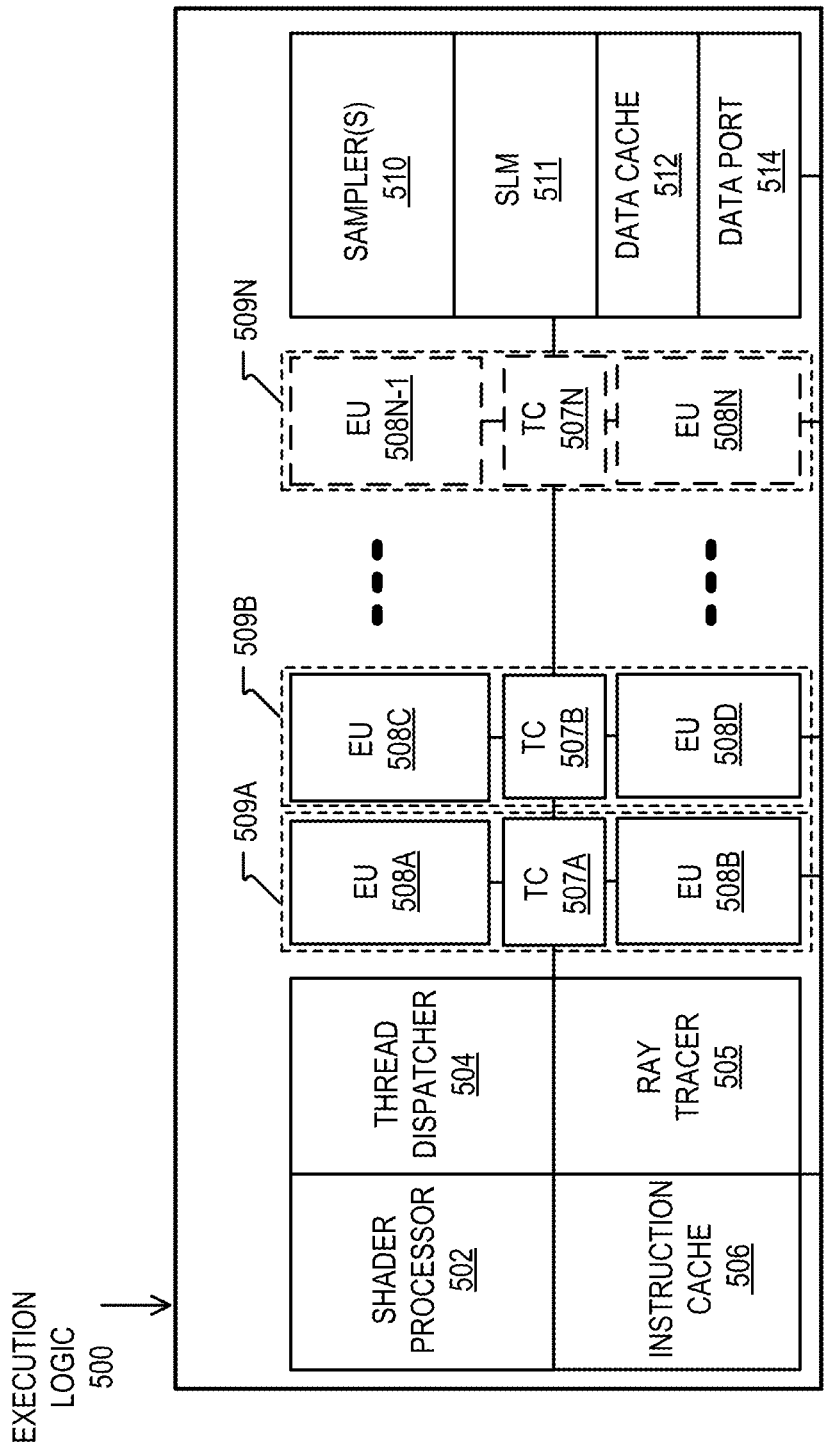
FIGS. 14A-14B is a block diagram of an example of thread execution logic of a graphics processor core according to an embodiment.
Figure 14B:
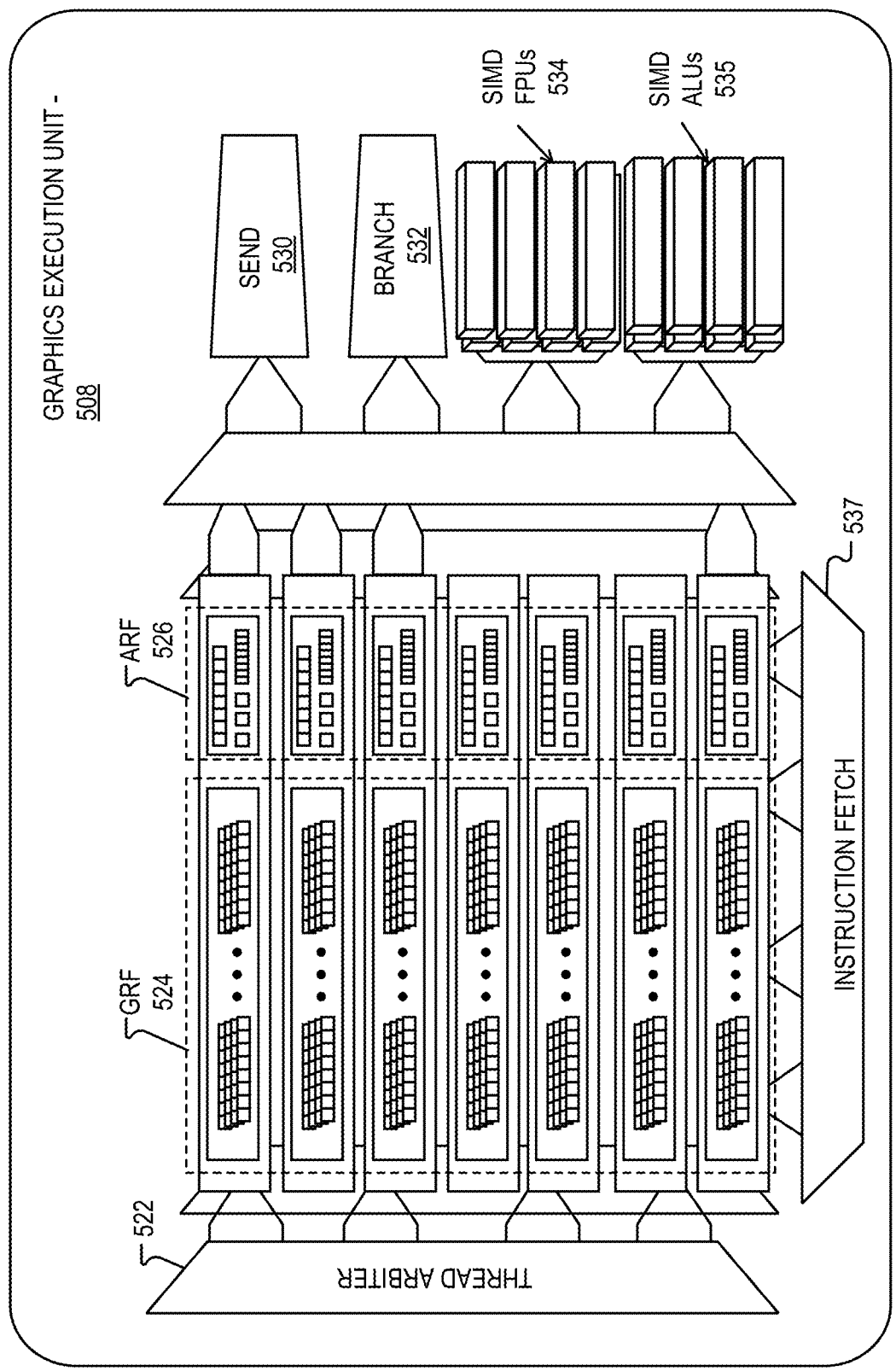

FIGS. 14A-14B illustrate thread execution logic 500 including an array of processing elements employed in a graphics processor core according to embodiments described herein. Elements of FIGS. 14A-14B having the same reference numbers (or names) as the elements of any other figure herein can operate or function in any manner similar to that described elsewhere herein, but are not limited to such. FIG. 14A-14B illustrates an overview of thread execution logic 500, which may be representative of hardware logic illustrated with each sub-core 221A-221F of FIG. 11B. FIG. 14A is representative of an execution unit within a general-purpose graphics processor, while FIG. 14B is representative of an execution unit that may be used within a compute accelerator.

As illustrated in FIG. 14A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 11C.

FIG. 14B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 15:
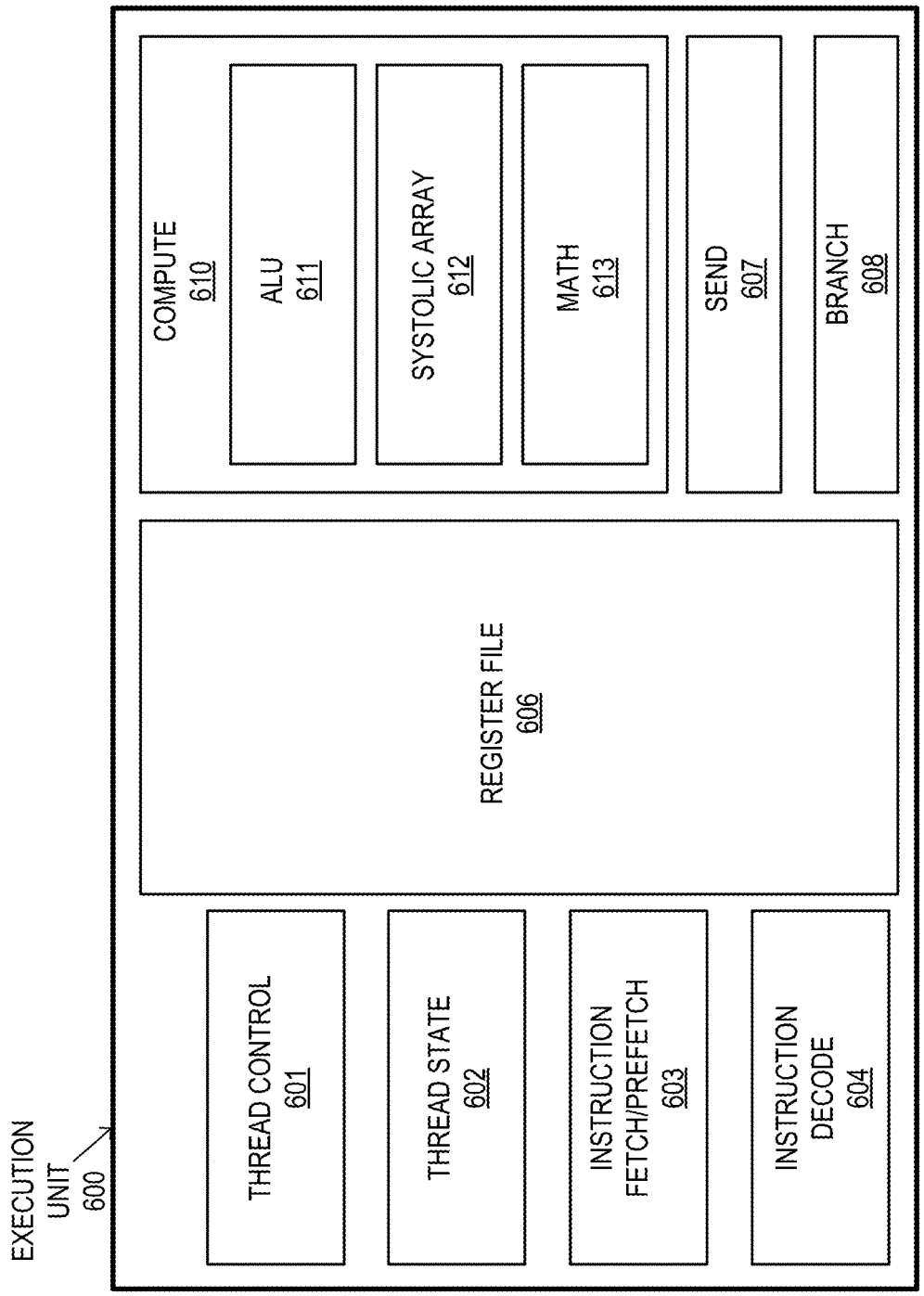
FIG. 15 illustrates an example of an additional execution unit according to an embodiment.

FIG. 15 illustrates an additional execution unit 600, according to an embodiment. The execution unit 600 may be a compute-optimized execution unit for use in, for example, a compute engine tile 340A-340D as in FIG. 12C, but is not limited as such. Variants of the execution unit 600 may also be used in a graphics engine tile 310A-310D as in FIG. 12B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 14B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 13). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 14A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

FIG. 16 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel.

In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic opcode group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 17:
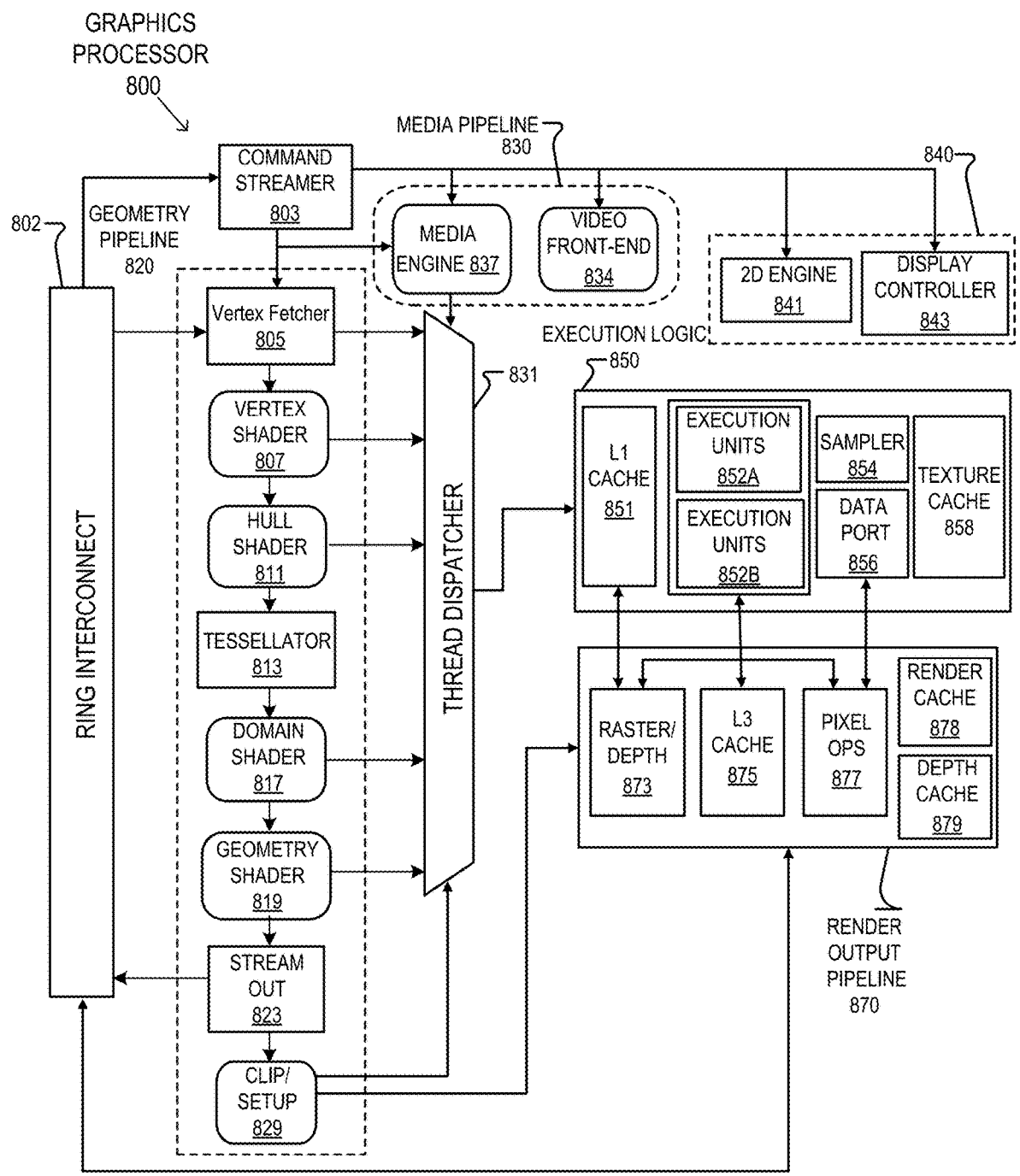
FIG. 17 is a block diagram of another example of a graphics processor according to an embodiment.

FIG. 17 is a block diagram of another embodiment of a graphics processor 800. Elements of FIG. 17 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 18A is a block diagram illustrating a graphics processor command format 900 according to some embodiments. FIG. 18B is a block diagram illustrating a graphics processor command sequence 910 according to an embodiment. The solid lined boxes in FIG. 18A illustrate the components that are generally included in a graphics command while the dashed lines include components that are optional or that are only included in a sub-set of the graphics commands. The exemplary graphics processor command format 900 of FIG. 18A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 18B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state commands 916 include selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 19:
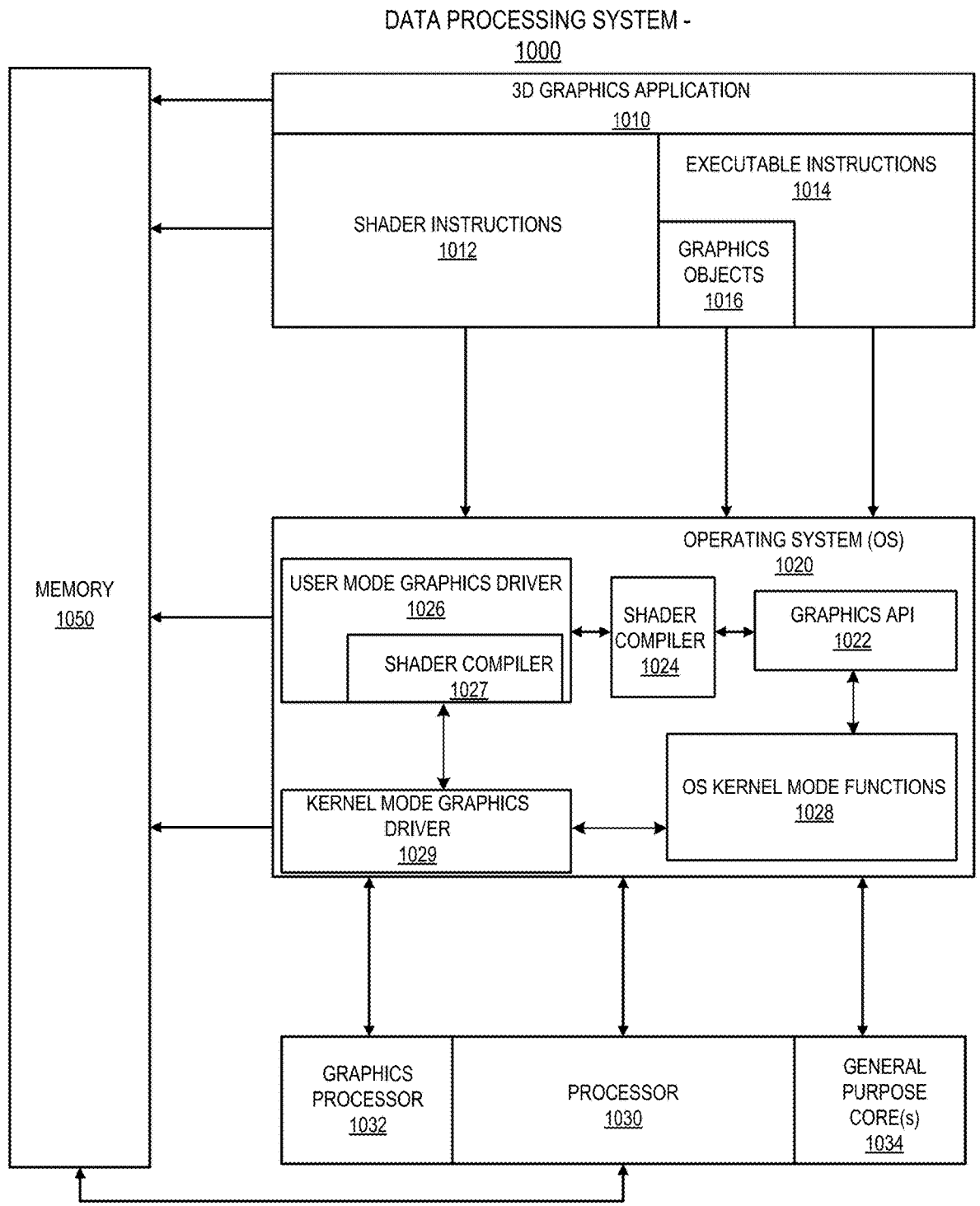
FIG. 19 illustrates an example graphics software architecture for a data processing system according to an embodiment.

FIG. 19 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 20A:
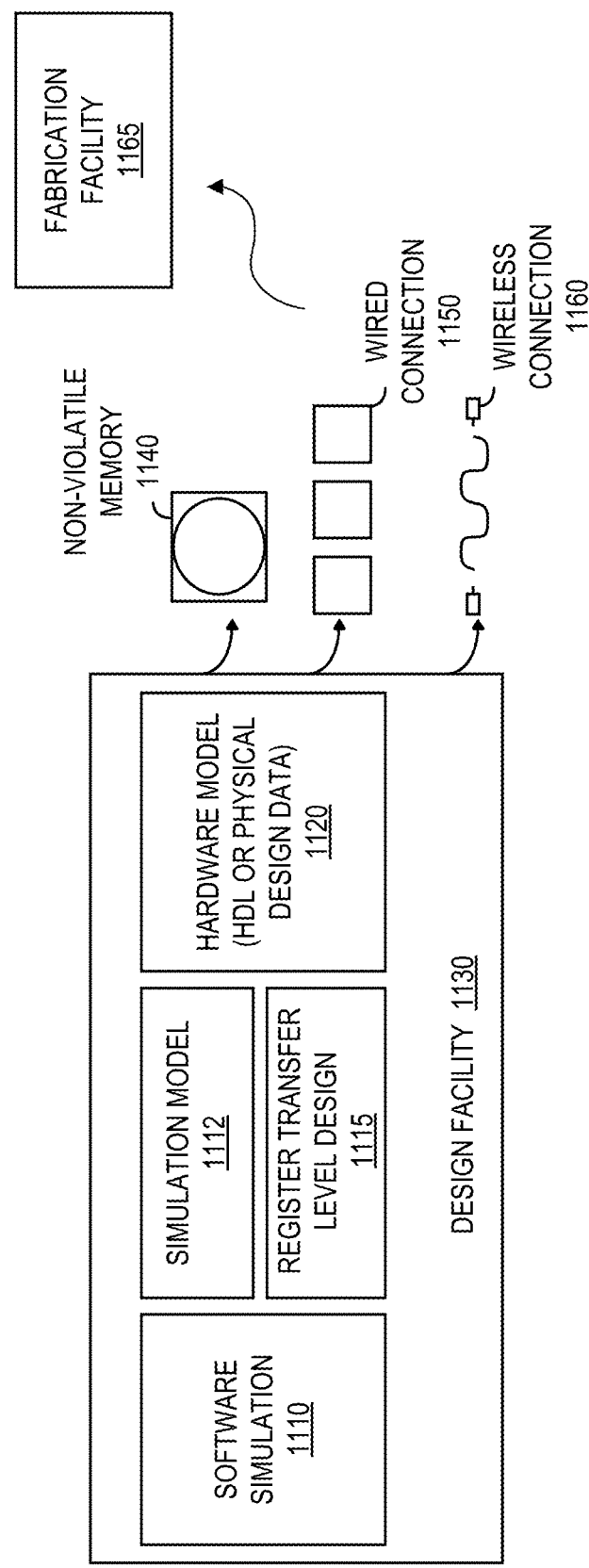
FIG. 20A is a block diagram illustrating an example of an IP core development system according to an embodiment.

FIG. 20A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 20B:
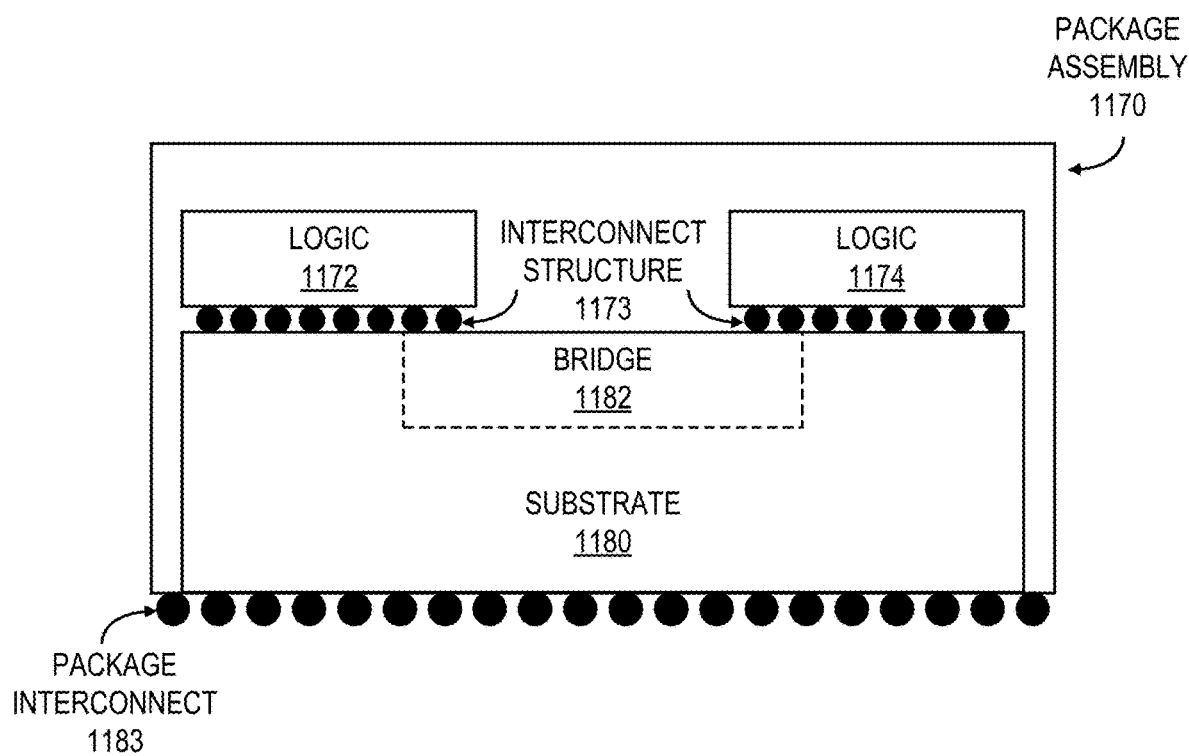
FIG. 20B illustrates an example of a cross-section side view of an integrated circuit package assembly according to an embodiment.

FIG. 20B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 20C:
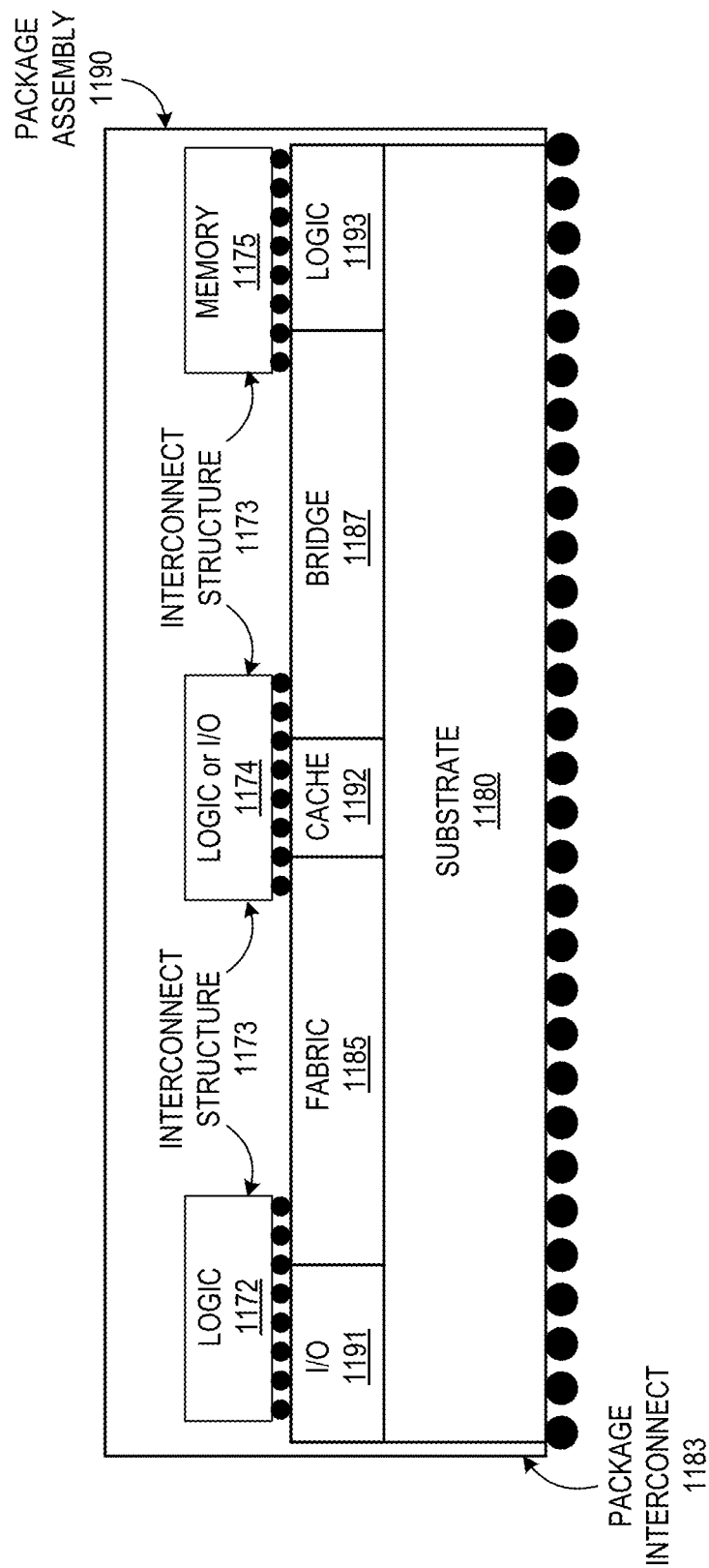
FIGS. 20C-20D illustrates examples of package assemblies according to an embodiment.

FIG. 20C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 20D:
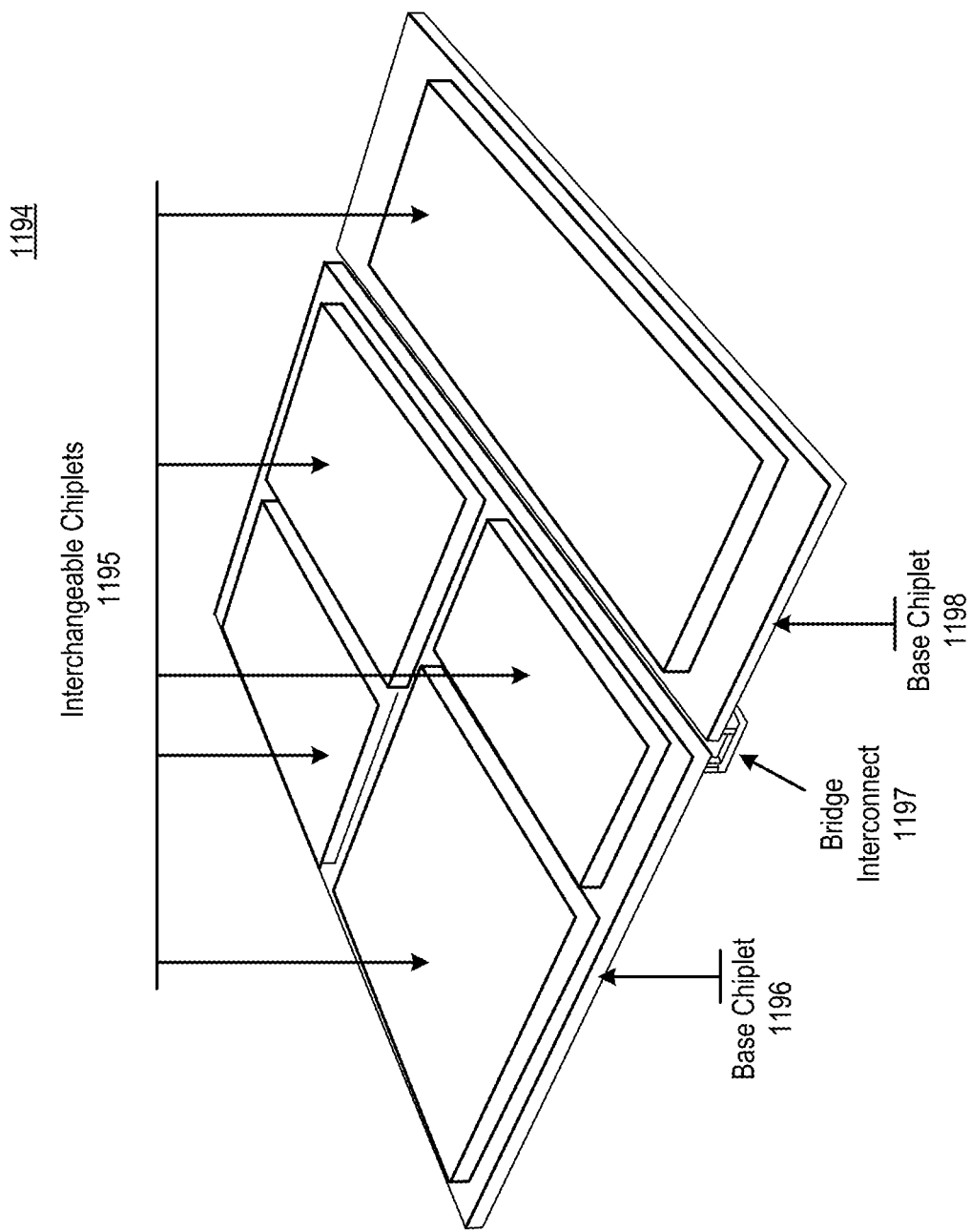

FIG. 20D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 21:
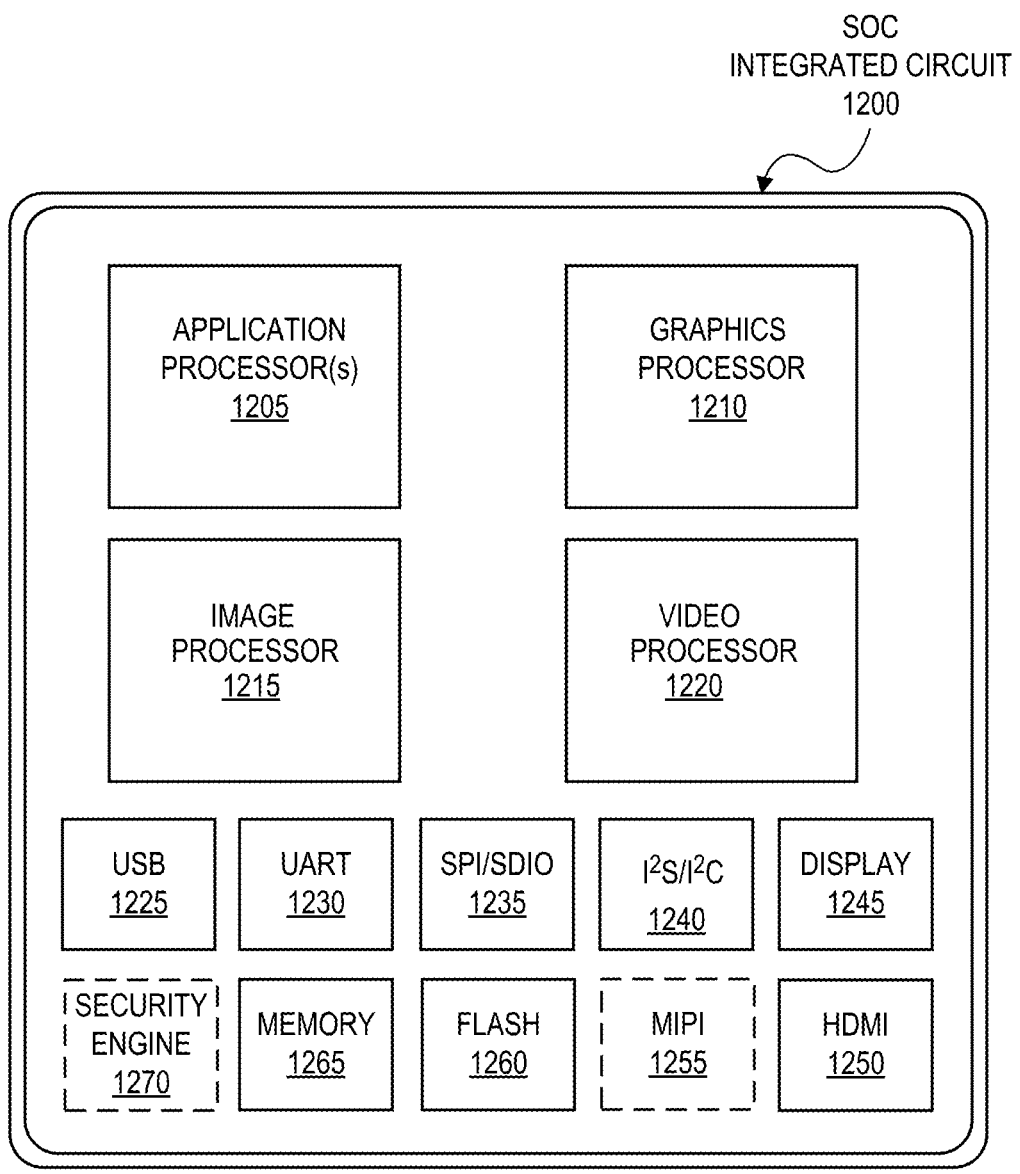
FIG. 21 is a block diagram illustrating an example of a system on a chip integrated circuit according to an embodiment.
Figure 22A:
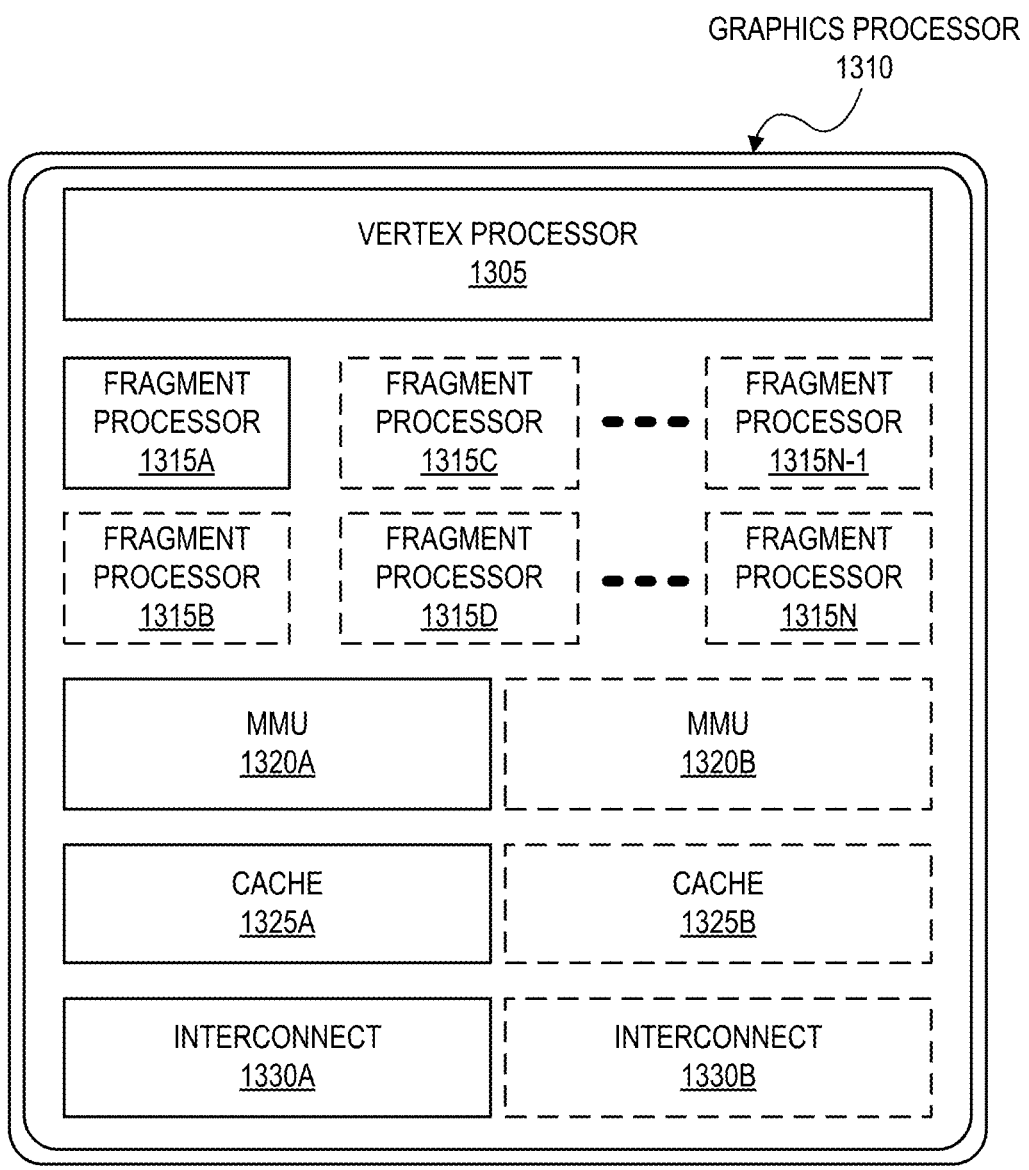
FIGS. 22A-22B are block diagrams illustrating exemplary graphics processors for use within an SoC, according to embodiments.
Figure 22B:
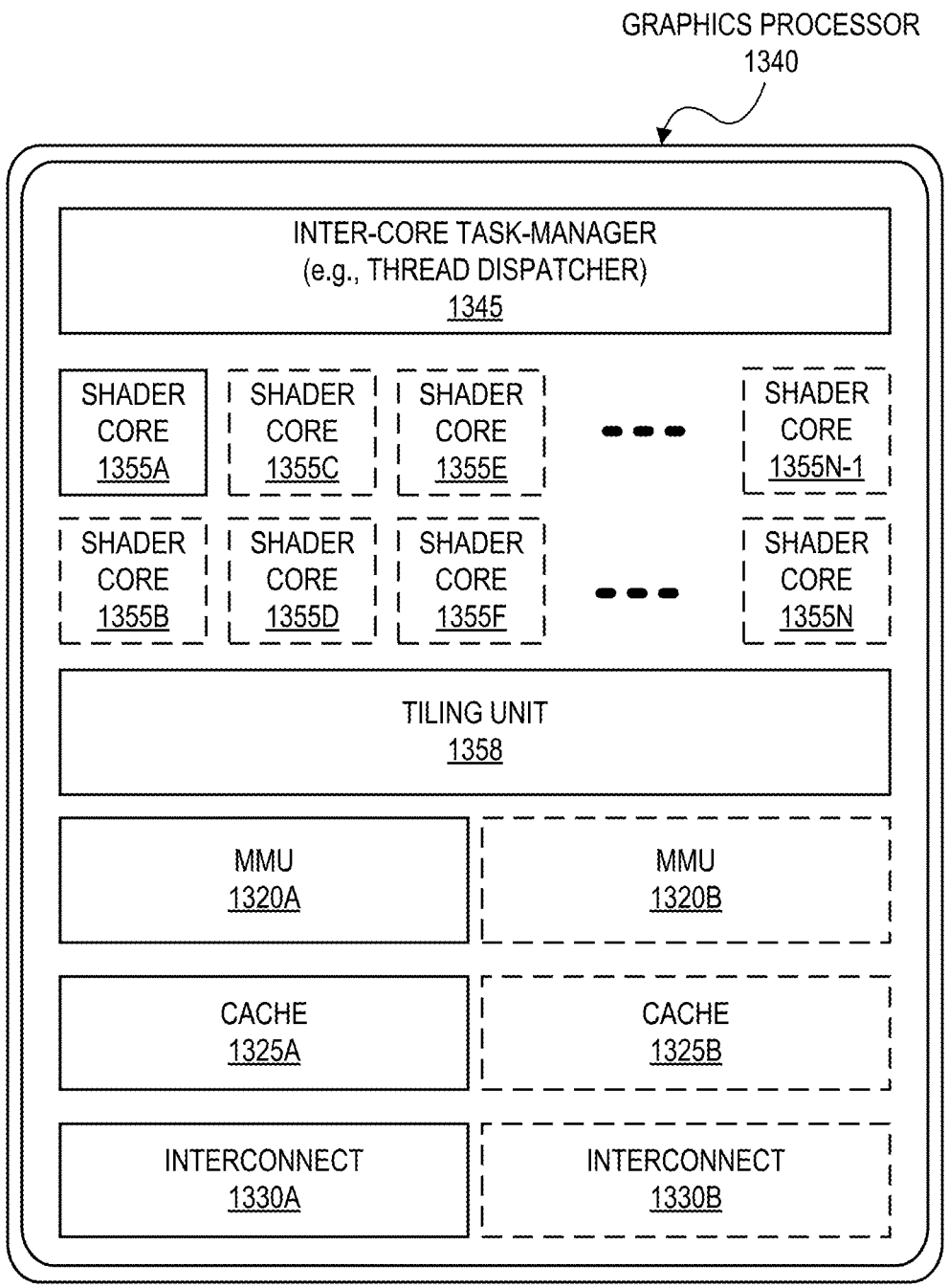

FIGS. 21-22B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 21 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIGS. 22A-22B are block diagrams illustrating exemplary graphics processors for use within an SoC, according to embodiments described herein. FIG. 22A illustrates an exemplary graphics processor 1310 of a system on a chip integrated circuit that may be fabricated using one or more IP cores, according to an embodiment. FIG. 22B illustrates an additional exemplary graphics processor 1340 of a system on a chip integrated circuit that may be fabricated using one or more IP cores, according to an embodiment. Graphics processor 1310 of FIG. 22A is an example of a low power graphics processor core. Graphics processor 1340 of FIG. 22B is an example of a higher performance graphics processor core. Each of the graphics processors 1310, 1340 can be variants of the graphics processor 1210 of FIG. 21.

As shown in FIG. 22A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 21, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 22B, graphics processor 1340 includes the one or more MMU(s) 1320A-1320B, cache(s) 1325A-1325B, and circuit interconnect(s) 1330A-1330B of the graphics processor 1310 of FIG. 22A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

The technology described herein therefore provides for improved computing performance in several ways, including finer control of programming graphics hardware over existing solutions, natural creation of command lists using C-style language and not dedicated host APIs, fast and easy integration into upper level compilers like DPC++; quicker implementation of computational tasks. The disclosed technology provides for performance optimizations such as, e.g., reducing CPU-GPU communication overhead and CPU-space/GPU-space hardware roundtrips, automatic optimization of control flow of command buffers consumed by graphics hardware by using common compiler optimization passes (e.g. from LLVM). The disclosed technology also provides for preparing and building offline whole command buffers full of shaders (kernels) to be cached for future use.

Embodiments of each of the above systems, devices, components and/or methods can be implemented in hardware, software, or any suitable combination thereof. For example, hardware implementations can include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

ADDITIONAL NOTES AND EXAMPLES

Example 1 includes a performance-enhanced computing system comprising a processor, and a memory coupled to the processor to store instructions which, when executed by the processor, cause the processor to compile a source file to generate a command list, wherein the command list comprises a set of hardware-specific executable commands for a graphics processing unit (GPU), and dispatch the command list to a command buffer for execution by the GPU.

Example 2 includes the computing system of Example 1, wherein the processor is to dispatch the command list via an application programming interface (API) call to a graphics driver, wherein the API call is to bypass generating GPU commands for the command list, and wherein the graphics driver is to bypass encoding the hardware-specific executable commands in the command list.

Example 3 includes the computing system of Example 1, wherein the instructions, when executed, further cause the processor to store the command list, and retrieve the command list from storage prior to dispatching the command list to the command buffer.

Example 4 includes the computing system of Example 1, wherein the instructions, when executed, further cause the processor to compile a subset source file to generate a subset command list, store the subset command list, retrieve the subset command list from storage, and add the subset command list to the command list prior to dispatching the command list to the command buffer, wherein the subset source file includes a function specific to a particular shader or kernel.

Example 5 includes the computing system of Example 1, wherein the source file includes function calls specific to GPU hardware blocks, and wherein the command list includes executable commands directed to the GPU hardware blocks based on the function calls.

Example 6 includes the computing system of Example 1, wherein the command list includes one or more of an executable loop command, an executable conditional branch command, or an executable jump command.

Example 7 includes the computing system of Example 1, wherein the command list comprises a first command list for dispatch to a first command buffer for execution by the GPU and a second command list for dispatch to a second command buffer for execution by the GPU, and wherein the first command list includes an instruction to wait for execution until a coordinating event is produced by the second command list.

Example 8 includes the computing system of any one of Examples 1-7, wherein the command list is reconfigurable at runtime.

Example 9 includes at least one non-transitory computer readable storage medium comprising a set of instructions which, when executed by a computing system, cause the computing system to compile a source file to generate a command list, wherein the command list comprises a set of hardware-specific executable commands for a graphics processing unit (GPU), and dispatch the command list to a command buffer for execution by the GPU.

Example 10 includes the at least one non-transitory computer readable storage medium of Example 9, wherein the processor is to dispatch the command list via an application programming interface (API) call to a graphics driver, wherein the API call is to bypass generating GPU commands for the command list, and wherein the graphics driver is to bypass encoding the hardware-specific executable commands in the command list.

Example 11 includes the at least one non-transitory computer readable storage medium of Example 9, wherein the instructions, when executed, further cause the computing system to store the command list, and retrieve the command list from storage prior to dispatching the command list to the command buffer.

Example 12 includes the at least one non-transitory computer readable storage medium of Example 9, wherein the instructions, when executed, further cause the computing system to compile a subset source file to generate a subset command list, store the subset command list, retrieve the subset command list from storage, and add the subset command list to the command list prior to dispatching the command list to the command buffer, wherein the subset source file includes a function specific to a particular shader or kernel.

Example 13 includes the at least one non-transitory computer readable storage medium of Example 9, wherein the source file includes function calls specific to GPU hardware blocks, and wherein the command list includes executable commands directed to the GPU hardware blocks based on the function calls.

Example 14 includes the at least one non-transitory computer readable storage medium of Example 9, wherein the command list includes one or more of an executable loop command, an executable conditional branch command, or an executable jump command.

Example 15 includes the at least one non-transitory computer readable storage medium of Example 9, wherein the command list comprises a first command list for dispatch to a first command buffer for execution by the GPU and a second command list for dispatch to a second command buffer for execution by the GPU, and wherein the first command list includes an instruction to wait for execution until a coordinating event is produced by the second command list.

Example 16 includes the at least one non-transitory computer readable storage medium of any one of Examples 9-15, wherein the command list is reconfigurable at runtime.

Example 17 includes a method comprising compiling a source file to generate a command list, wherein the command list comprises a set of hardware-specific executable commands for a graphics processing unit (GPU), and dispatching the command list to a command buffer for execution by the GPU.

Example 18 includes the method of Example 17, wherein the processor dispatches the command list via an application programming interface (API) call to a graphics driver, wherein the API call bypasses generating GPU commands for the command list, and wherein the graphics driver bypasses encoding the hardware-specific executable commands in the command list.

Example 19 includes the method of Example 17, further comprising storing the command list, and retrieving the command list from storage prior to dispatching the command list to the command buffer.

Example 20 includes the method of Example 17, further comprising compiling a subset source file to generate a subset command list, storing the subset command list, retrieving the subset command list from storage, and adding the subset command list to the command list prior to dispatching the command list to the command buffer, wherein the subset source file includes a function specific to a particular shader or kernel.

Example 21 includes the method of Example 17, wherein the source file includes function calls specific to GPU hardware blocks, and wherein the command list includes executable commands directed to the GPU hardware blocks based on the function calls.

Example 22 includes the method of Example 17, wherein the command list includes one or more of an executable loop command, an executable conditional branch command, or an executable jump command.

Example 23 includes the method of Example 17, wherein the command list comprises a first command list for dispatch to a first command buffer for execution by the GPU and a second command list for dispatch to a second command buffer for execution by the GPU, and wherein the first command list includes an instruction to wait for execution until a coordinating event is produced by the second command list.

Example 24 includes the method of any one of Examples 17-23, wherein the command list is reconfigurable at runtime.

Example 25 includes an apparatus comprising means for compiling a source file to generate a command list, wherein the command list comprises a set of hardware-specific executable commands for a graphics processing unit (GPU), and means for dispatching the command list to a command buffer for execution by the GPU.

Example 26 includes an apparatus comprising means for performing the method of any one of Examples 17-23.

Example 27 includes a semiconductor apparatus comprising one or more substrates, and logic coupled to the one or more substrates, the logic implemented at least partly in one or more of configurable logic or fixed-functionality hardware logic, the logic to compile a source file to generate a command list, wherein the command list comprises a set of hardware-specific executable commands for a graphics processing unit (GPU), and dispatch the command list to a command buffer for execution by the GPU.

Example 28 includes the semiconductor apparatus of Example 27, wherein the logic is to dispatch the command list via an application programming interface (API) call to a graphics driver, wherein the API call is to bypass generating GPU commands for the command list, and wherein the graphics driver is to bypass encoding the hardware-specific executable commands in the command list.

Example 29 includes the semiconductor apparatus of Example 27, wherein the logic is further to store the command list, and retrieve the command list from storage prior to dispatching the command list to the command buffer.

Example 30 includes the semiconductor apparatus of Example 27, wherein the logic is further to compile a subset source file to generate a subset command list, store the subset command list, retrieve the subset command list from storage, and add the subset command list to the command list prior to dispatching the command list to the command buffer, wherein the subset source file includes a function specific to a particular shader or kernel.

Example 31 includes the semiconductor apparatus of Example 27, wherein the source file includes function calls specific to GPU hardware blocks, and wherein the command list includes executable commands directed to the GPU hardware blocks based on the function calls.

Example 32 includes the semiconductor apparatus of Example 27, wherein the command list includes one or more of an executable loop command, an executable conditional branch command, or an executable jump command.

Example 33 includes the semiconductor apparatus of Example 27, wherein the command list comprises a first command list for dispatch to a first command buffer for execution by the GPU and a second command list for dispatch to a second command buffer for execution by the GPU, and wherein the first command list includes an instruction to wait for execution until a coordinating event is produced by the second command list.

Example 34 includes the includes the semiconductor apparatus of any one of Examples 27-33, wherein the command list is reconfigurable at runtime.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system, comprising:
a first processor; and
a memory coupled to the first processor to store instructions which, when executed by the first processor, cause the first processor to:
compile a source file to generate a command list, wherein the command list comprises a set of hardware-specific executable commands for a second processor comprising a graphics processing unit (GPU); and
dispatch the command list to a command buffer for execution by the GPU, the command list compiled by the first processor to be reconfigurable at runtime by the GPU, wherein reconfiguration of the command list comprises change a flow order of the command list.

2. The computing system of claim 1, wherein the first processor is to dispatch the command list via an application programming interface (API) call to a graphics driver, wherein the API call is to bypass generating GPU commands for the command list, and wherein the graphics driver is to bypass encoding the set of hardware-specific executable commands in the command list.

3. The computing system of claim 1, wherein the instructions, when executed, further cause the first processor to:
store the command list; and
retrieve the command list from storage prior to dispatching the command list to the command buffer.

4. The computing system of claim 1, wherein the instructions, when executed, further cause the first processor to:
compile a subset source file to generate a subset command list;
store the subset command list;
retrieve the subset command list from storage; and
add the subset command list to the command list prior to dispatching the command list to the command buffer;
wherein the subset source file includes a function specific to a particular shader or kernel.

5. The computing system of claim 1, wherein the source file includes function calls specific to GPU hardware blocks, and wherein the command list includes executable commands directed to the GPU hardware blocks based on the function calls.

6. The computing system of claim 1, wherein the command list includes one or more of an executable loop command, an executable conditional branch command, or an executable jump command.

7. The computing system of claim 1, wherein the command list comprises a first command list for dispatching to a first command buffer for execution by the GPU and a second command list for dispatching to a second command buffer for execution by the GPU, and wherein the first command list includes an instruction to wait for execution until a coordinating event is produced by the second command list.

8. At least one non-transitory computer readable storage medium comprising a set of instructions which, when executed by a computing system, cause the computing system to:
compile, by a first processor, a source file to generate a command list, wherein the command list comprises a set of hardware-specific executable commands for a second processor comprising a graphics processing unit (GPU); and
dispatch the command list to a command buffer for execution by the GPU, the command list compiled by the first processor to be reconfigurable at runtime by the GPU, wherein reconfiguration of the command list comprises change a flow order of the command list.

9. The at least one non-transitory computer readable storage medium of claim 8, wherein the first processor is to dispatch the command list via an application programming interface (API) call to a graphics driver, wherein the API call is to bypass generating GPU commands for the command list, and wherein the graphics driver is to bypass encoding the set of hardware-specific executable commands in the command list.

10. The at least one non-transitory computer readable storage medium of claim 8, wherein the set of instructions, when executed, further cause the computing system to:
store the command list; and
retrieve the command list from storage prior to dispatching the command list to the command buffer.

11. The at least one non-transitory computer readable storage medium of claim 8, wherein the set of instructions, when executed, further cause the computing system to:
compile a subset source file to generate a subset command list;
store the subset command list;
retrieve the subset command list from storage; and
add the subset command list to the command list prior to dispatching the command list to the command buffer;
wherein the subset source file includes a function specific to a particular shader or kernel.

12. The at least one non-transitory computer readable storage medium of claim 8, wherein the source file includes function calls specific to GPU hardware blocks, and wherein the command list includes executable commands directed to the GPU hardware blocks based on the function calls.

13. The at least one non-transitory computer readable storage medium of claim 8, wherein the command list includes one or more of an executable loop command, an executable conditional branch command, or an executable jump command.

14. The at least one non-transitory computer readable storage medium of claim 8, wherein the command list comprises a first command list for dispatching to a first command buffer for execution by the GPU and a second command list for dispatching to a second command buffer for execution by the GPU, and wherein the first command list includes an instruction to wait for execution until a coordinating event is produced by the second command list.

15. A method comprising:
compiling, by a first processor, a source file to generate a command list, wherein the command list comprises a set of hardware-specific executable commands for a second processor comprising a graphics processing unit (GPU); and
dispatching the command list to a command buffer for execution by the GPU, the command list compiled by the first processor to be reconfigurable at runtime by the GPU, wherein reconfiguration of the command list comprises change a flow order of the command list.

16. The method of claim 15, wherein the first processor dispatches the command list via an application programming interface (API) call to a graphics driver, wherein the API call bypasses generating GPU commands for the command list, and wherein the graphics driver bypasses encoding the set of hardware-specific executable commands in the command list.

17. The method of claim 15, further comprising:
storing the command list; and
retrieving the command list from storage prior to dispatching the command list to the command buffer.

18. The method of claim 15, further comprising:
compiling a subset source file to generate a subset command list;
storing the subset command list;
retrieving the subset command list from storage; and
adding the subset command list to the command list prior to dispatching the command list to the command buffer;
wherein the subset source file includes a function specific to a particular shader or kernel.

19. The method of claim 15, wherein the source file includes function calls specific to GPU hardware blocks, and wherein the command list includes executable commands directed to the GPU hardware blocks based on the function calls.

20. The method of claim 15, wherein the command list includes one or more of an executable loop command, an executable conditional branch command, or an executable jump command.

21. The method of claim 15, wherein the command list comprises a first command list for dispatching to a first command buffer for execution by the GPU and a second command list for dispatching to a second command buffer for execution by the GPU, and wherein the first command list includes an instruction to wait for execution until a coordinating event is produced by the second command list.

22. An apparatus comprising:
first logic of a first processor to compile a source file to generate a command list, wherein the command list comprises a set of hardware-specific executable commands for a second processor comprising a graphics processing unit (GPU); and
second logic of the first processor to dispatch the command list to a command buffer for execution by the GPU, the command list compiled by the first processor to be reconfigurable at runtime by the GPU, wherein reconfiguration of the command list comprises change a flow order of the command list.

* * * * *